United States Patent
Lin et al.

(10) Patent No.: US 12,135,483 B2
(45) Date of Patent: Nov. 5, 2024

(54) DISPLAY PANEL AND DISPLAY APPARATUS

(71) Applicant: Xiamen Tianma Micro-Electronics Co., Ltd., Xiamen (CN)

(72) Inventors: Jie Lin, Xiamen (CN); Bingping Liu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/330,851

(22) Filed: Jun. 7, 2023

(65) Prior Publication Data
US 2023/0324752 A1 Oct. 12, 2023

(30) Foreign Application Priority Data

Mar. 30, 2023 (CN) .......................... 202310329167.1

(51) Int. Cl.
*G02F 1/1339* (2006.01)
*G02F 1/1362* (2006.01)

(52) U.S. Cl.
CPC .... *G02F 1/13394* (2013.01); *G02F 1/136286* (2013.01); *G02F 1/136209* (2013.01); *G02F 1/136222* (2021.01)

(58) Field of Classification Search
CPC ........... G02F 1/136286; G02F 1/13392; G02F 1/13394
See application file for complete search history.

(56) References Cited

U.S. PATENT DOCUMENTS

2018/0348555 A1* 12/2018 Okita ..................... G02F 1/1339
2021/0356831 A1* 11/2021 Liu ........................ G02F 1/1339

FOREIGN PATENT DOCUMENTS

| CN | 102955297 A | 3/2013 |
| CN | 113741101 A | 12/2021 |
| CN | 114690489 A | 7/2022 |

OTHER PUBLICATIONS

Office Action mailed Jul. 20, 2024, issued in corresponding Chinese Application No. 202310329167.1 filed Mar. 30, 2023, 7 pages.

* cited by examiner

*Primary Examiner* — Dung T Nguyen
(74) *Attorney, Agent, or Firm* — CHRISTENSEN O'CONNOR JOHNSON KINDNESS PLLC

(57) ABSTRACT

A display panel and a display apparatus are provided. The display panel includes an array substrate; a color film substrate; support pillars; pixel sub-units; and data lines. The support pillars include a primary support pillar that includes a first support pillar. The pixel sub-units are formed by crossing the scan lines and the data lines. The pixel sub-units each include a thin film transistor and a pixel electrode. The thin film transistor includes a gate, a source and a drain. The scan line is electrically connected to the gate. The data line is electrically connected to the source. The pixel electrode is electrically connected to the drain. The present disclosure can enhance supporting capacity of the display panel.

26 Claims, 18 Drawing Sheets

DISPLAY PANEL AND DISPLAY APPARATUS

CROSS-REFERENCE TO RELATED APPLICATION

The present application claims priority to Chinese Patent Application No. 202310329167.1, filed on Mar. 30, 2023, the content of which is incorporated herein by reference in its entirety.

TECHNICAL FIELD

The present disclosure relates to the field of display technologies, and particularly, relates to a display panel and a display apparatus.

BACKGROUND

As higher requirements for lower cost and thinness of display screens are put forward, some thick layers such as a planarization layer on the array substrate has to be removed from display panels to meet cost and thinness requirements.

A planarization layer on an array substrate is used to planarize the surface of the array substrate after preparation of thin film transistors or signal wires, the surface of the array substrate is not flat due to patterning relevant layers. After the planarization layer is removed, the surface of the array substrate is convex in the area where the signal wires are disposed, and concave in the area where no signal wire is disposed. Moreover, the width of the signal wires is small, and therefore an area of the convex area is small. In order to prevent the signal wires on the display panel from reflecting light, a black matrix is usually provided above the signal wires for shading. Generally, support pillars for supporting the display panel are disposed in the area of the signal wires. Since liquid crystal molecules around the support pillars can be squeezed to cause light leakage, the black matrix above the signal wires in this design can be used for shading the area of the support pillars, so as to minimize the shading area of the black matrix, and increase the area of light-emitting area of the display panel. However, since the area of the support surface of the support pillars is usually larger than the area of convex area of the signal wires, when the display panel is subjected to the impact of external forces, displacement occurs between the support pillars and convex area of the signal wires, and aligning the support pillars with the convex area of the signal wires does not occurs, resulting in insufficient support for the display panel. Consequently, the thickness of the liquid crystal layer formed at different positions between the array substrate and the opposite substrate is not uniform. Light passing through the liquid crystal layer of different thickness forms different optical path differences, which affects the uniformity of light-emitting and can cause light leakage. Even if the display panel is not subjected to impact of external forces, because of the alignment deviation between the signal wires and the support pillars, the relative position relationship between the support pillars and signal wires varies in different areas. That is, support pillars partially aligns with the convex area of the signal wires, while support pillars in some other areas can slip and no support is formed with the convex area of the signal wires, causing insufficient support of the display panel and affecting the light-emitting uniformity.

Therefore, how to achieve good support for the display panel without the planarization layer while ensuring a large light-emitting area of the display panel, that is, ensuring the aperture ratio, to achieve high brightness display, is a problem that urgently needs to be solved in the art.

SUMMARY

In a first aspect, the present disclosure provides a display panel. The display panel includes an array substrate; a color film substrate disposed opposite to the array substrate; support pillars disposed between the array substrate and the color film substrate; pixel sub-units arranged in an array; scan lines extending in a first direction; and data lines extending in a second direction. The support pillars include a primary support pillar disposed at a side of one of the array substrate or the color film substrate and abutting against a surface of the other of the array substrate or the color film substrate. The primary support pillar includes a first support pillar. The first direction and the second direction intersect each other. The pixel sub-units are formed by crossing the scan lines and the data lines. The pixel sub-units each include a thin film transistor and a pixel electrode. The thin film transistor includes a gate, a source and a drain. The scan line is electrically connected to the gate. The data line is electrically connected to the source. The pixel electrode is electrically connected to the drain. In the first direction, a projection of the first support pillar in a direction perpendicular to a plane of the display panel is located between projections of two adjacent data lines in the direction perpendicular to the plane of the display panel. In the second direction, the projection of the first support pillar in the direction perpendicular to the plane of the display panel is located at a side of a projection of the scan line in the direction perpendicular to the plane of the display panel.

In a second aspect, the present disclosure provides a display apparatus. The display apparatus includes the display panel described in the first aspect.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art without paying creative efforts.

DESCRIPTION OF EMBODIMENTS

The technical solutions in the embodiments of the present disclosure are clearly and completely described in details with reference to the accompanying drawings. Obviously, the described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Figure 1:
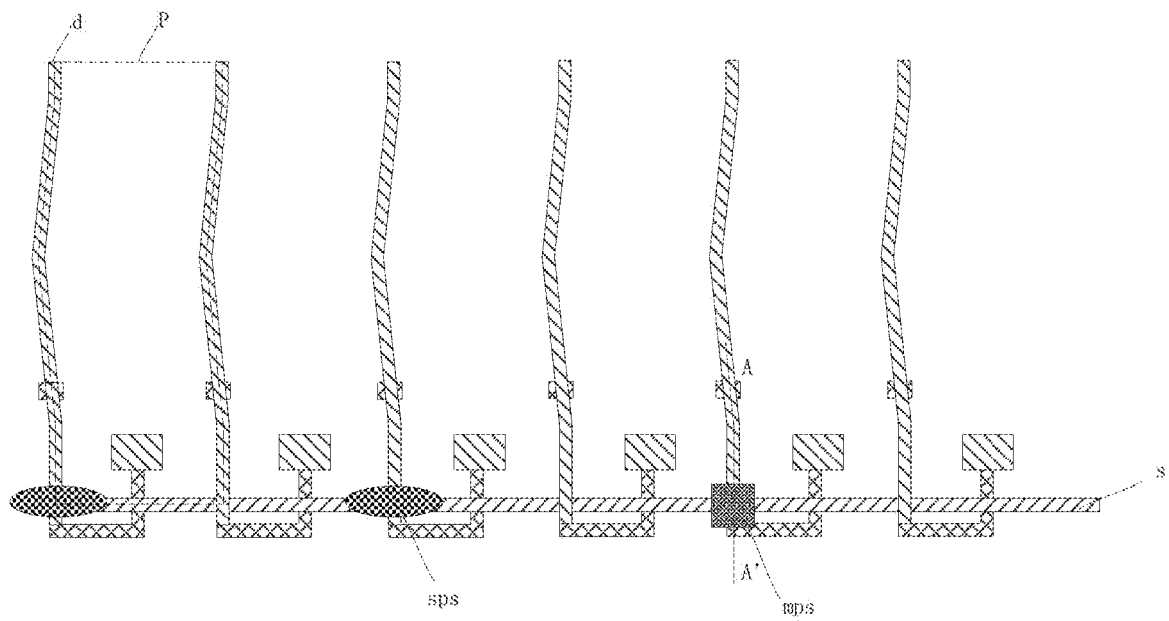
FIG. 1 is a partial top view of a display panel in the related art.
Figure 2:
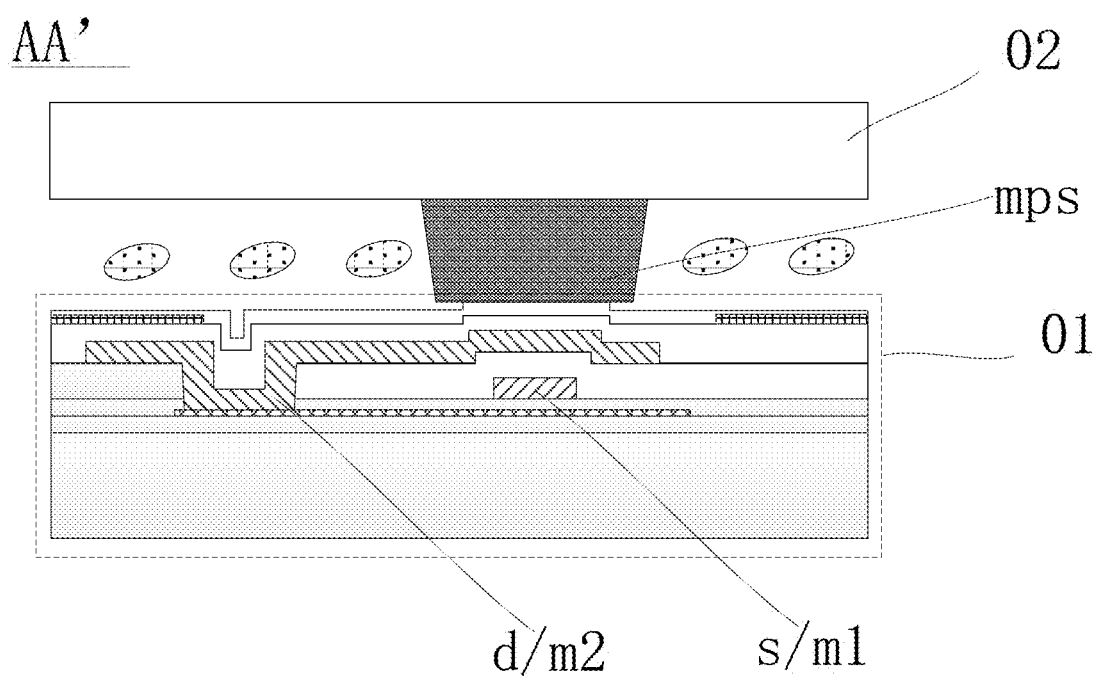
FIG. 2 is a cross-sectional view along a line A-A' shown in FIG. 1 in the related art.

At present, the requirement for thin display panels is increasing, and the cost of display panels is decreasing, causing the layers of display panels thinner and fewer. Driven by the requirement for thinness and low cost, for example, the planarization layer on the array substrate can need to be deleted, which will lead to the uneven surface of the layer after patterning the signal lines and driving elements in the display panel. That is, the area that the metal layer is disposed on the array substrate is thicker than the area that the metal layer is not disposed on the array substrate. Referring to FIG. 1 and FIG. 2, FIG. 1 is a partial top view of a display panel in the related art; and FIG. 2 is a cross-sectional view along a line A-A' shown in FIG. 1 in the related art. FIG. 1 shows multiple pixel sub-units P. The pixel sub-units P are formed by crossing scan lines s and data lines d. Support pillars include a primary support pillar mps and auxiliary support pillars sps. The primary support pillar mps plays a main supporting role. As shown in FIG. 2, the display panel in FIG. 2 includes an array substrate 01 and a color film substrate 02. One end of the primary support pillar mps is disposed at a side of the color film substrate 02, and the other end of the primary support pillar mps abuts against a side of the array substrate 01 to support the display panel. The array substrate 01 includes at least one metal layer. The scan line s is located in a first metal layer m1, the data line d is located in a second metal layer m2, and the array substrate 01 has no planarization layer. Due to the height of the metal layers, the area where the scan line s and the data line d are located protrudes toward the color film substrate 02, especially the area where the scan line s and the data line d overlap has the greatest protruding height. In a direction perpendicular to a plane of the display panel, a projection of the primary support pillar mps overlaps an overlapping area between the scan line s and the data line d. The surface area of the primary support pillar mps at a side abutting against the array substrate 01 is much larger than the line width of the scan line s and the data line d, so that not all surface of the primary support pillar mps is occupied on the flat surface, and some areas are unsupported. The primary support pillar is likely to tilt or slide to a lower area on the array substrate 01 when the display panel is subjected to impact of external forces. As a result, the insufficient support for the display panel further leads to inhomogeneous thickness of the liquid crystal layer formed at different positions between the array substrate 01 and the color film substrate 02. Light passing through the liquid crystal layer having different thickness forms different optical path differences, which affects the uniformity of light-emitting and can cause light leakage.

The inventor of the present disclosure found that even if the primary support pillar mps avoids the overlapping area between the scan line s and the data line d, that is, the primary support pillar mps overlaps only scan line s or only data line d, the above problem still exists. The inventor further found that if the support position of the primary support pillar mps is not moved, one solution is that the primary support pillar mps stands on a relatively flat surface by increasing the line width of the scan line s and/or data line d at the position corresponding to the primary support pillar mps. However, this solution increases the parasitic capacitance between the scan line s and the data line d, which is not conducive to charging the pixel units on the display panel. Alternatively, in another solution, the scan line s and/or the data line d are winded at the support position of the primary support pillar mps, which can also ensure that the primary support pillar mps stands on a relatively flat surface, but this solution is not conducive to wiring of the display panel and sacrifices a large light transmission area, thus affecting the brightness of the display panel.

Figure 3:
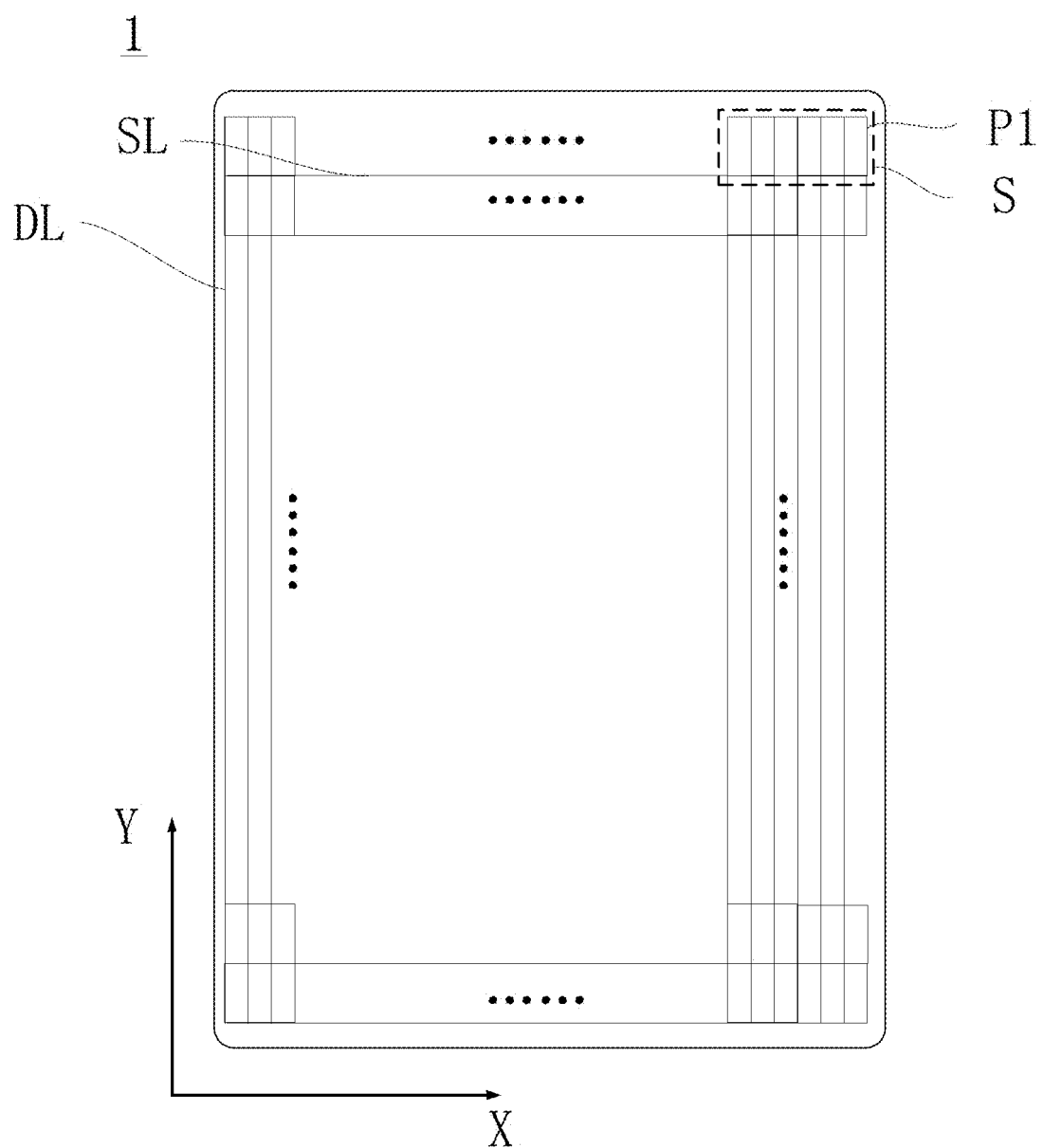
FIG. 3 is a schematic top view of a display panel according to an embodiment of the present disclosure.
Figure 4:
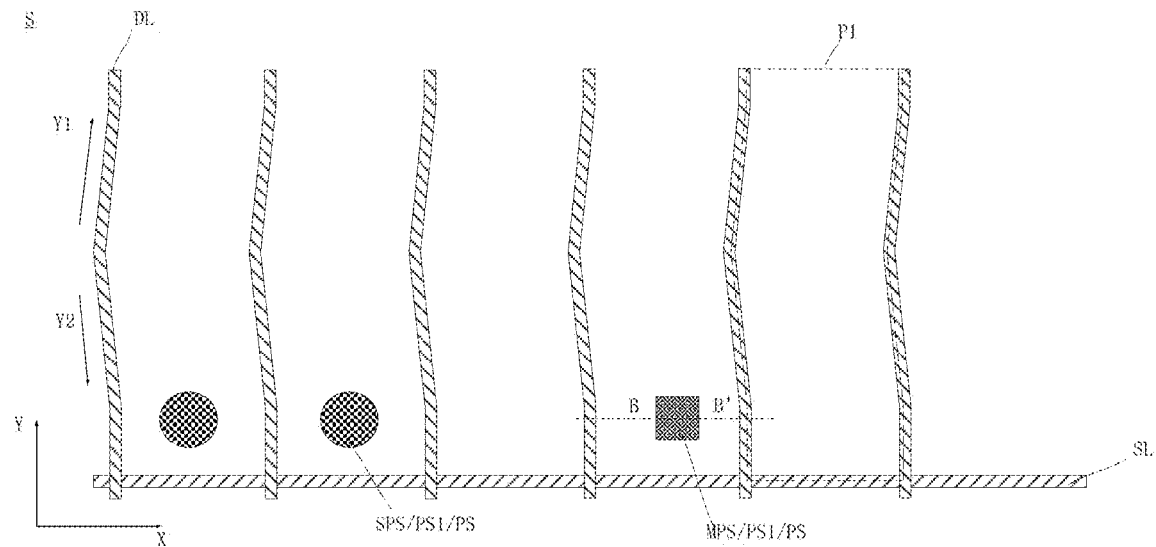
FIG. 4 is a schematic diagram of an area S of the display panel in FIG. 3 according to an embodiment of the present disclosure.
Figure 5:
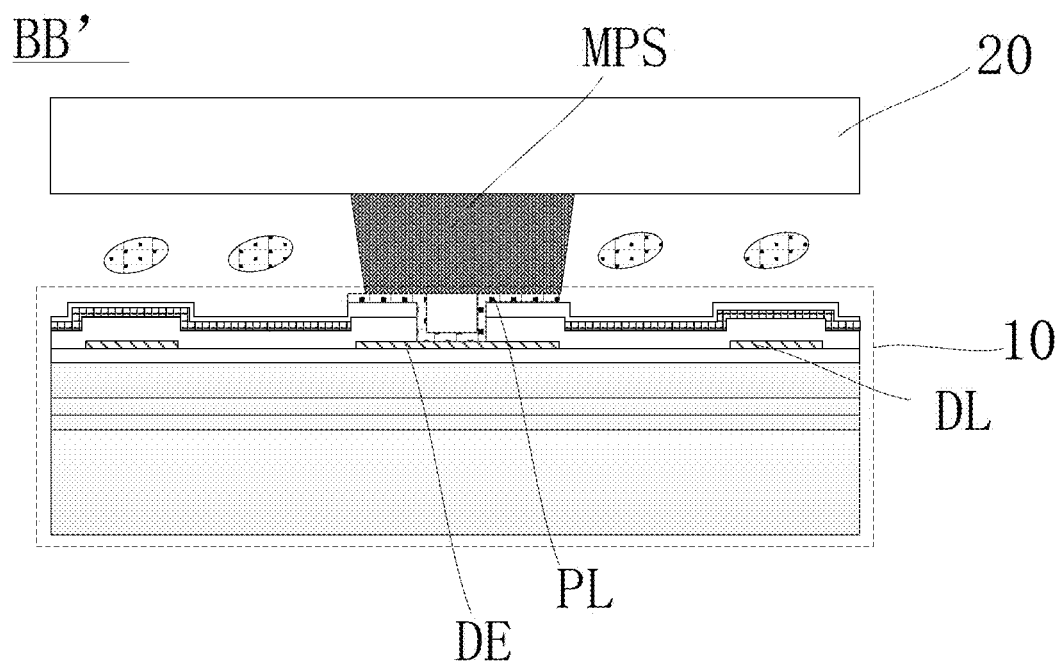
FIG. 5 is a cross-sectional view along a line B-B' shown in FIG. 4 according to an embodiment of the present disclosure.

In view of the above problems, the embodiments of the present disclosure provide a display panel. FIG. 3 is a schematic top view of a display panel according to an embodiment of the present disclosure; FIG. 4 is a schematic diagram of an area S of the display panel in FIG. 3 according to an embodiment of the present disclosure; and FIG. 5 is a cross-sectional view along a line B-B' shown in FIG. 4 according to an embodiment of the present disclosure. As shown in FIG. 3 to FIG. 5, the display panel 1 includes an array substrate 10, a color film substrate 20, and support pillars PS located between the array substrate 10 and the color film substrate 20. The array substrate 10 and the color film substrate 20 are opposite to each other. The support pillars PS include a primary support pillar MPS. The primary support pillar MPS is disposed at a side of the color film substrate 20 and abuts against the array substrate 10. Optionally, in some embodiments of the present disclosure, the primary support pillar MPS can be disposed at a side of the array substrate 10 and abuts against the color film substrate 20.

The display panel 1 includes multiple pixel sub-units P1 arranged in an array, scan lines SL extending along a first direction X, and data lines DL extending along a second direction Y. The first direction X and the second direction Y intersect each other. The pixel sub-units P1 are formed by crossing the scan lines SL and the data lines DL. In some embodiments of the present disclosure, as shown in FIG. 4, the extending direction of the pixel sub-unit P1 includes Y1 and Y2. The pixel sub-units P1 each include a pixel electrode PL (not shown in FIG. 4). The extending direction of the pixel electrode PL includes Y1 and Y2, and the extending direction of the data line DL also includes Y1 and Y2. Y1 and Y2 intersect the first direction X, that is, the pixel sub-unit P1 is a double-domain pixel sub-unit. In some embodiments of the present disclosure, the pixel sub-unit P1 can alternatively be a single-domain pixel sub-unit, or a multi-domain pixel sub-unit with more than two domains. That is, the pixel electrode extends in a single direction or multiple directions, all of which are included in the embodiments of the present disclosure. The pixel sub-unit P1 includes a thin film transistor T (not shown in FIG. 4). The thin film transistor T includes a gate, a source, and a drain DE. The scan line SL is electrically connected to the gate of the thin film transistor T, the data line DL is electrically connected to the source of the thin film transistor T, and the pixel electrode PL is electrically connected to the drain DE of the thin film transistor T.

The primary support pillar MPS in the display panel 1 includes a first support pillar PS1. In the first direction X, a projection of the first support pillar PS1 in a direction perpendicular to a plane of the display panel 1 is located between projections of two adjacent data lines DL in the direction perpendicular to the plane of the display panel 1. In the second direction Y, the projection of the first support pillar PS1 in the direction perpendicular to the plane of the display panel 1 is located at a side of a projection of the scan line SL in the direction perpendicular to the plane of the display panel 1. That is, the first support pillar PS1 is disposed in the area enclosed by two adjacent data lines DL and the scan line SL, and is disposed adjacent to the scan line SL. In some embodiments of the present disclosure, the first support pillar PS1 can overlap the drain DE, which is also located in the area enclosed by the two adjacent data lines DL and the scan line SL, and the projection area of the drain DE can be increased appropriately to make the surface of the abutting area of the first support pillar PS1 relatively flat. Alternatively, the first support pillar PS1 does not overlap the drain DE, so that the surface of the abutting area of the first support pillar PS1 is also relatively flat.

In the display panel 1 provided in the present disclosure, the primary support pillars MPS in some areas are disposed between two data lines DL in the first direction X and disposed at a side of the scan line SL in the second direction Y, that is, avoiding the area where the scan line SL and the data lines DL are located. In this way, the primary support pillar MPS is prevented from contacting the convex area at which the data lines DL and the scan lines SL are located, that is, the primary support pillar MPS abuts against a relatively flat surface to form a good support for the display panel 1, and avoid abnormal display due to poor support when the display panel 1 is subjected to impact of external forces. In addition, the primary support pillars MPS can be disposed adjacent to the scan line SL. Generally, the width of a black matrix disposed along the first direction X on the display panel 1 is greater than the width of a black matrix disposed along the second direction Y. Therefore, the primary support pillar MPS is disposed adjacent to the scan line SL, and can be shaded by the black matrix above the scan line SL, so that light leakage caused by liquid crystal disturbance around the primary support pillar MPS is avoided, achieving normal display of the display panel 1. In addition, the shading area of the black matrix is reduced to ensure high brightness display of the display panel 1.

In some embodiments of the present disclosure, referring to FIG. 3 and FIG. 4, the support pillars PS further include auxiliary support pillars SPS. In the direction perpendicular to the plane of the display panel 1, the height of the primary support pillar MPS is greater than the height of the auxiliary support pillars SPS, that is, the auxiliary support pillars SPS play a role of auxiliary support. When the display panel 1 is not subjected to impact of external forces, the auxiliary support pillars SPS do not come into contact with the opposite substrate. Only when the display panel 1 is subjected to impact of external forces such as pressing by external forces, the auxiliary support pillars SPS can abut against the substrate opposite to it. In some embodiments of the present disclosure, at least some auxiliary support pillars SPS are also disposed in the area enclosed by two adjacent data lines DL and the scan line SL, and disposed adjacent to the scan line SL, that is, the primary support pillar MPS and the auxiliary support pillars SPS each include the first support pillars PS1. The first support pillars PS1 are located in corresponding positions in the pixel sub-units P1. On the one hand, when the display panel 1 is pressed by an external force, the auxiliary support pillar SPS comes into contact with the substrate opposite to it, and the contact plane can be relatively flat, thus preventing the auxiliary support pillars SPS of the display panel 1 from tilting and deviating, and enhancing the supporting capacity of the display panel 1. On the other hand, the primary support pillar MPS and the auxiliary support pillars SPS are disposed at corresponding positions in the pixel sub-units P1, such that the centers of the black matrices above the primary support pillar MPS and the auxiliary support pillars SPS are approximately on a same horizontal line, so that narrower black matrices can be provided to shade the support pillars PS, thereby maximizing the light transmission of the display panel 1 and further achieving high brightness display of the display panel 1.

Figure 6:
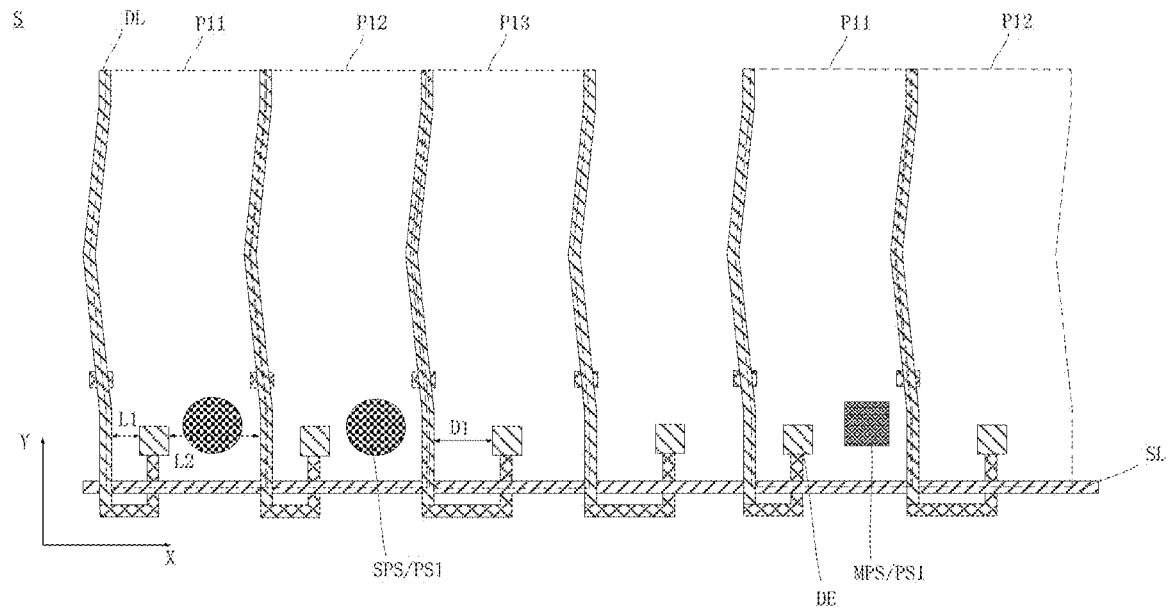
FIG. 6 is a schematic diagram of the area S of the display panel in FIG. 3 according to another embodiment of the present disclosure.

FIG. 6 is a schematic diagram of the area S of the display panel in FIG. 3 according to another embodiment of the present disclosure. In some embodiments of the present disclosure, referring to FIG. 3 and FIG. 6, the pixel sub-units P1 include first pixel sub-units P11 and second pixel sub-units P12. The first pixel sub-unit P11 and the second pixel sub-unit P12 are disposed adjacent to each other in the first direction X. In a direction perpendicular to the plane of the display panel 1, a projection of the data line DL electrically connected to the second pixel sub-unit P12 is located between a projection of the drain DE of the first pixel sub-unit P11 and a projection of the drain DE of the second pixel sub-unit P12. That is, in the first direction X, the drain DE of the first pixel sub-unit P11, the data line DL electrically connected to the second pixel sub-unit P12, and the drain DE of the second pixel sub-unit P12 are arranged sequentially.

Further, in the direction perpendicular to the plane of the display panel 1, a projection of the first support pillar PS1 can overlap a projection of the first pixel sub-unit P11, and the projection of the first support pillar PS1 is located between the projection of the drain DE of the first pixel sub-unit P11 and the projection of the data line DL electrically connected to the second pixel sub-unit P12. That is, the first support pillar PS1 occupies between the projection of the drain DE of the first pixel sub-unit P11 and the projection of the data line DL electrically connected to the second pixel sub-unit P12. In some embodiments of the present disclosure, the first support pillars PS1 can include a primary support pillar MPS and auxiliary support pillars SPS. On the one hand, the first support pillar PS1 is disposed between the projection of the drain DE of the first pixel sub-unit P11 and the projection of the data line DL electrically connected to the second pixel sub-unit P12, such that the first support pillar PS1 can be stopped in the first direction X by means of the convex portion at the drain DE and the data line DL, thereby limiting the sliding of the first support pillar PS1. On the other hand, the first support pillars PS1 can avoid the drain DE to prevent the through hole through which the pixel electrode PL is electrically connected to the drain DE from affecting the support of the first support pillar PS1, so that the flatness of the support surface of the first support pillar PS1 is ensured, and the support force of the display panel 1 is ensured, avoiding abnormal display caused by poor support when the display panel 1 is subjected to impact of external forces.

In some embodiments of the present disclosure, referring to FIG. 6, in the direction perpendicular to the plane of the display panel 1, a distance in the first direction X between the projection of the data line DL electrically connected to the first pixel sub-unit P11 and the projection of the drain DE is defined as L1, a distance in the first direction X between the projection of the drain DE corresponding to the first pixel sub-unit P11 and the projection of the data line DL electrically connected to the second pixel sub-unit P12 is defined as L2, and L1<L2. The distance between the drain DE and the data line DL corresponding to the first pixel sub-unit P11 is reduced in the first direction X to make space for the support position of the first support pillar PS1, thereby facilitating disposing of the first support pillar PS1. In this way, the first pixel sub-unit P11 has sufficient space for accommodating the first support pillar PS1, so that the support force of the display panel 1 is effectively ensured, thereby avoiding abnormal display caused by poor support when the display panel 1 is subjected to impact of external forces.

Further, L1 is set to be greater than or equal to 2.8 that is, the distance in the first direction X between the projection of the drain DE and the projection of the data line DL electrically connected to the first pixel sub-unit P11 is greater than or equal to 2.8 On the one hand, no short circuit occurs between the data line DL and the drain DE of the first pixel sub-unit P11, and on the other hand, the parasitic capacitance between the data line DL and the drain DE of the first pixel sub-unit P11 is within a reasonable range, thus avoiding abnormal display of the first pixel sub-unit P11 and ensuring display uniformity of the display panel 1.

In some embodiments of the present disclosure, referring to FIG. 6, the pixel sub-units P1 include a third pixel sub-unit P13. In the direction perpendicular to the plane of the display panel 1, the third pixel sub-unit P13 is a pixel sub-unit P1 whose projection does not overlap the projection of the first support pillar PS1, and a distance in the first direction X between the projection of the drain DE and the projection of the data line DL electrically connected to the third pixel sub-unit P13 is defined as D1. D1 can be set to be greater than L1. That is, in the pixel sub-unit P1 without disposing the first support pillar PS1, the distance between the corresponding data line DL and the drain DE is not reduced in the first direction X, such that this distance is greater than the distance between the data line DL and the drain DE in the pixel sub-unit P1 having the first support pillar PS1. On the condition that the display difference between the first pixel sub-unit P11 and the third pixel sub-unit P13 is not easily detectable, the process difficulty of the pixel sub-unit P1 without disposing the first support pillar PS1 can be reduced.

Figure 7:
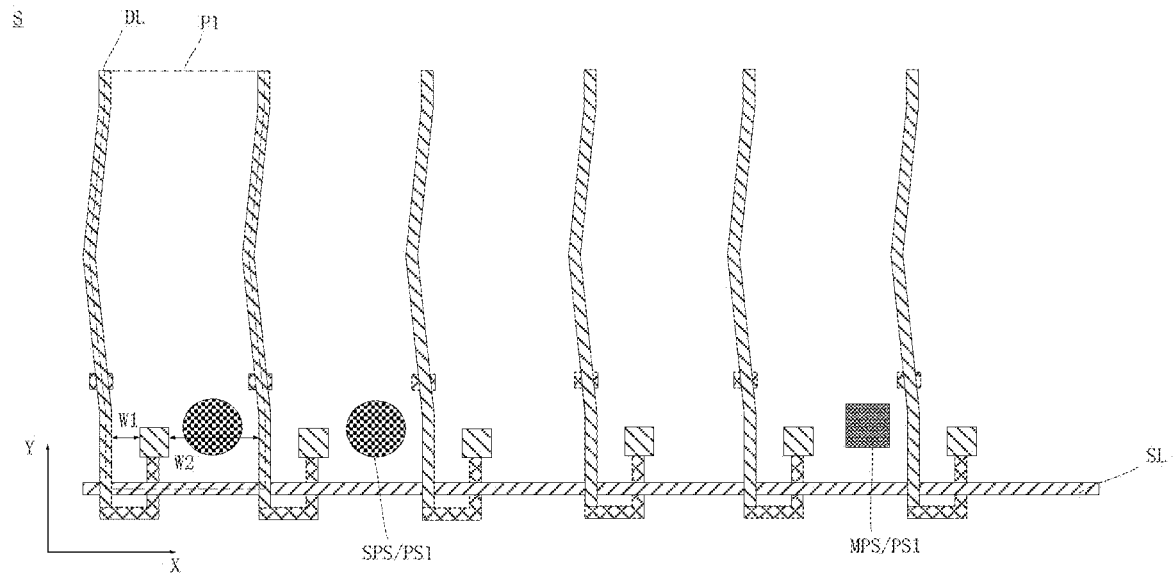
FIG. 7 is a schematic diagram of the area S of the display panel in FIG. 3 according to another embodiment of the present disclosure.

FIG. 7 is a schematic diagram of the area S of the display panel in FIG. 3 according to another embodiment of the present disclosure. In some embodiments of the present disclosure, for any pixel sub-unit P1 included in the display panel 1, in the direction perpendicular to the plane of the display panel 1, a distance W1 in the first direction X between the projection of the drain DE and the projection of the data line DL electrically connected to the pixel sub-unit P1 is smaller than a distance W2 in the first direction X between the projection of the drain DE and a projection of a data line DL electrically connected to an adjacent pixel sub-unit P1, that is, W1<W2. That is, regardless of whether the first support pillar PS1 is disposed, the distance between the corresponding data line DL and drain DE of any pixel sub-unit P1 is reduced in the first direction X, so that consistency among the pixel sub-units P1 can be ensured, thereby facilitating the uniform display of the display panel 1.

Figure 8:
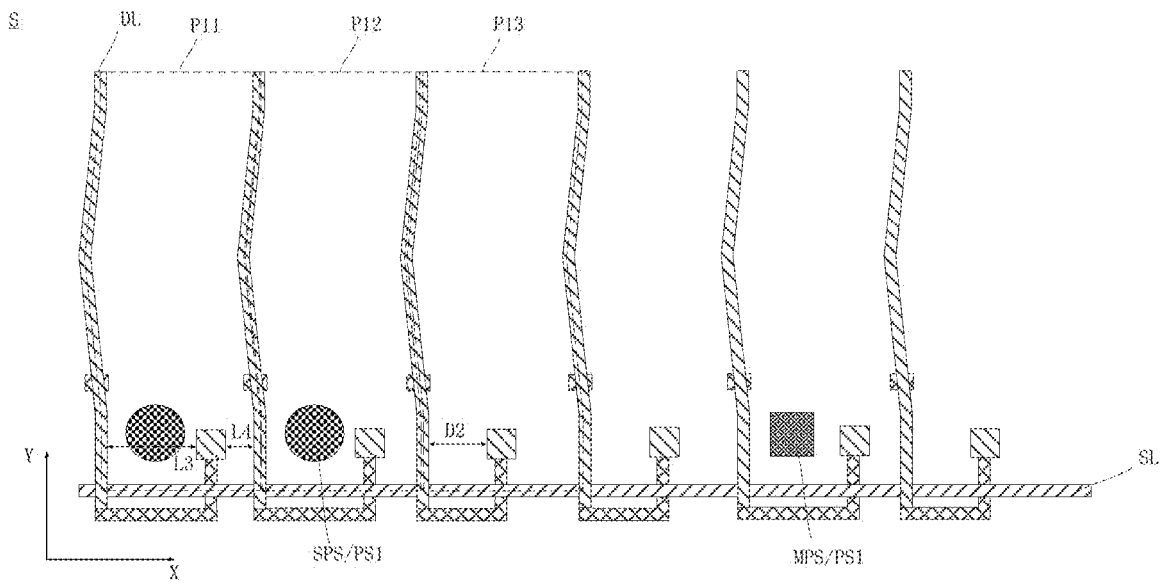
FIG. 8 is a schematic diagram of the area S of the display panel in FIG. 3 according to another embodiment of the present disclosure.

FIG. 8 is a schematic diagram of the area S of the display panel in FIG. 3 according to another embodiment of the present disclosure. In some embodiments of the present disclosure, referring to FIG. 3 and FIG. 8, further, in the direction perpendicular to the plane of the display panel 1, a projection of the first support pillar PS1 is disposed to overlap a projection of the first pixel sub-unit P11, and the projection of the first support pillar PS1 is located between the projection of the drain DE of the first pixel sub-unit P11 and the projection of the data line DL electrically connected to the first pixel sub-unit P11. That is, the first support pillar PS1 occupies between the projection of the drain DE of the first pixel sub-unit P11 and the projection of the data line DL electrically connected to the first pixel sub-unit P11. In some embodiments of the present disclosure, the first support pillars PS1 can include a primary support pillar MPS and auxiliary support pillars SPS. On the one hand, the supporting position of the first support pillar PS1 is disposed between the projection of the drain DE corresponding to the first pixel sub-unit P11 and the projection of the data line DL electrically connected to the first pixel sub-unit P11, such that the first support pillar PS1 can be stopped in the first direction X by means of the convex portion at the drain DE and the data line DL, thereby limiting the sliding of the first support pillar PS1. On the other hand, the first support pillars PS1 can avoid the drain DE to prevent the through hole through which the pixel electrode PL is electrically connected to the drain DE from affecting the first support pillar PS1, so that the flatness of the support surface of the first support pillar PS1 is ensured, and the support force of the display panel 1 is ensured, avoiding abnormal display caused by poor support when the display panel 1 is subjected to impact of external forces.

In some embodiments of the present disclosure, referring to FIG. 8, in the direction perpendicular to the plane of the display panel 1, a distance in the first direction X between the projection of the data line DL electrically connected to the first pixel sub-unit P11 and the projection of the drain DE is defined as L3, a distance in the first direction X between the projection of the drain DE corresponding to the first pixel sub-unit P11 and the projection of the data line DL electrically connected to the second pixel sub-unit P12 is defined as L4, and L3>L4. The distance between the drain DE and the data line DL corresponding to the first pixel sub-unit P11 is increased in the first direction X, and the distance between the drain DE corresponding to the first pixel sub-unit P 11 and the data line DL electrically connected to the second pixel sub-unit P12 is reduced in the first direction X, to make space for the support position of the first support pillar PS1, thereby facilitating disposing of the first support pillar PS1. In this way, the first pixel sub-unit P11 has sufficient space for accommodating the first support pillar PS1, so that the support force of the display panel 1 is effectively ensured, thereby avoiding abnormal display caused by poor support when the display panel 1 is subjected to impact of external forces.

Further, L4 is set to be greater than or equal to 2.8 that is, the distance in the first direction X between the projection of the drain DE corresponding to the first pixel sub-unit P11 and the projection of the data line DL electrically connected to the second pixel sub-unit P12 is greater than or equal to 2.8 On the one hand, no short circuit occurs between the data line DL corresponding to the second pixel sub-unit P12 and the drain DE of the first pixel sub-unit P11, and on the other hand, the parasitic capacitance between the data line DL corresponding to the second pixel sub-unit P12 and the drain DE of the first pixel sub-unit P11 is within a reasonable range, thus avoiding abnormal display of the second pixel sub-unit P12 and ensuring display uniformity of the display panel 1.

In some embodiments of the present disclosure, referring to FIG. 8, the pixel sub-units P1 include a third pixel sub-unit P13. In the direction perpendicular to the plane of the display panel 1, the third pixel sub-unit P13 is a pixel sub-unit P1 whose projection does not overlap the projection of the first support pillar PS1, and a distance in the first direction X between a projection of the drain DE and a projection of the data line DL electrically connected to the third pixel sub-unit P13 is defined as D2. D2 can be set to be smaller than L3. That is, in the third pixel sub-unit P13, the distance between the corresponding data line DL and the drain DE is not increased in the first direction X, and the distance between the corresponding drain DE and the data line DL electrically connected to an adjacent pixel sub-unit P1 is not reduced in the first direction X, such that the distance between the data line DL and the drain DE corresponding to the third pixel sub-unit P13 is smaller than the distance between the data line DL and the drain DE corresponding to the first pixel sub-unit P11, and the distance in the first direction X between the drain DE corresponding to the third pixel sub-unit P13 and the data line DL electrically connected to an adjacent pixel sub-unit P1 is relatively larger. On the condition that the display difference between the first pixel sub-unit P11 and the third pixel sub-unit P13 is not easily detectable, the process difficulty of the third pixel sub-unit P13 and the pixel sub-unit P1 adjacent to it can be reduced.

Figure 9:
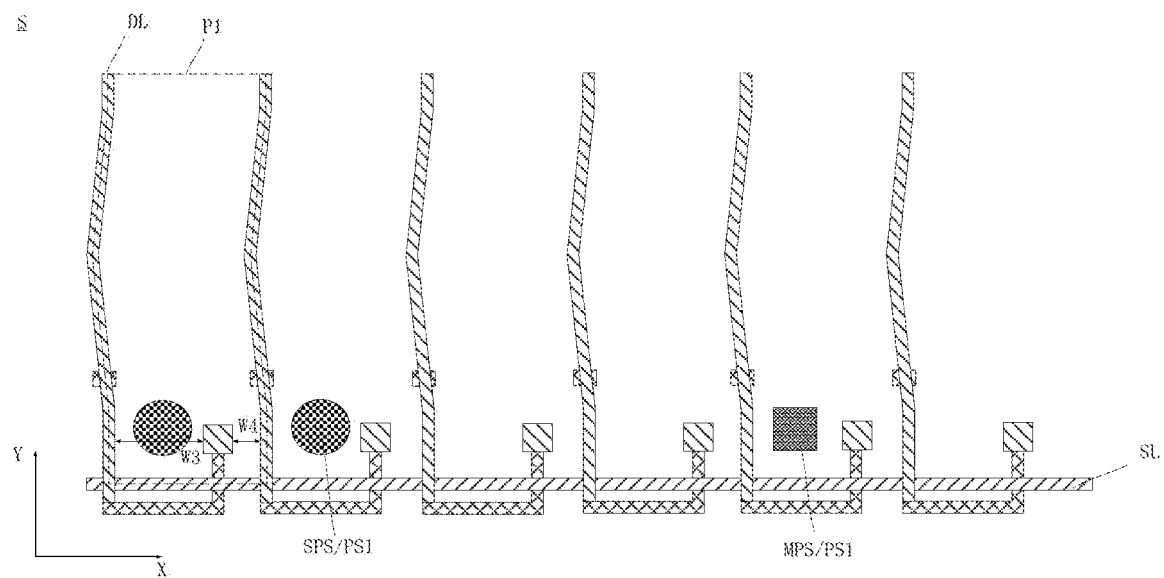
FIG. 9 is a schematic diagram of the area S of the display panel in FIG. 3 according to another embodiment of the present disclosure.

FIG. 9 is a schematic diagram of the area S of the display panel in FIG. 3 according to another embodiment of the present disclosure. In some embodiments of the present disclosure, for any pixel sub-unit P1 in the display panel 1, in the direction perpendicular to the plane of the display panel 1, a distance W3 in the first direction X between the projection of the drain DE and the projection of the data line DL electrically connected to the pixel sub-unit P1 is greater than a distance W4 in the first direction X between the projection of the drain DE and a projection of a data line DL electrically connected to an adjacent pixel sub-unit P1, that is, W3>W4. That is, regardless of whether the first support pillar PS1 is provided, the distance between the data line DL and the drain DE corresponding to any pixel sub-unit P1 is increased in the first direction X, so that consistency among the pixel sub-units P1 can be ensured, thereby facilitating the uniform display of the display panel 1.

Figure 10:
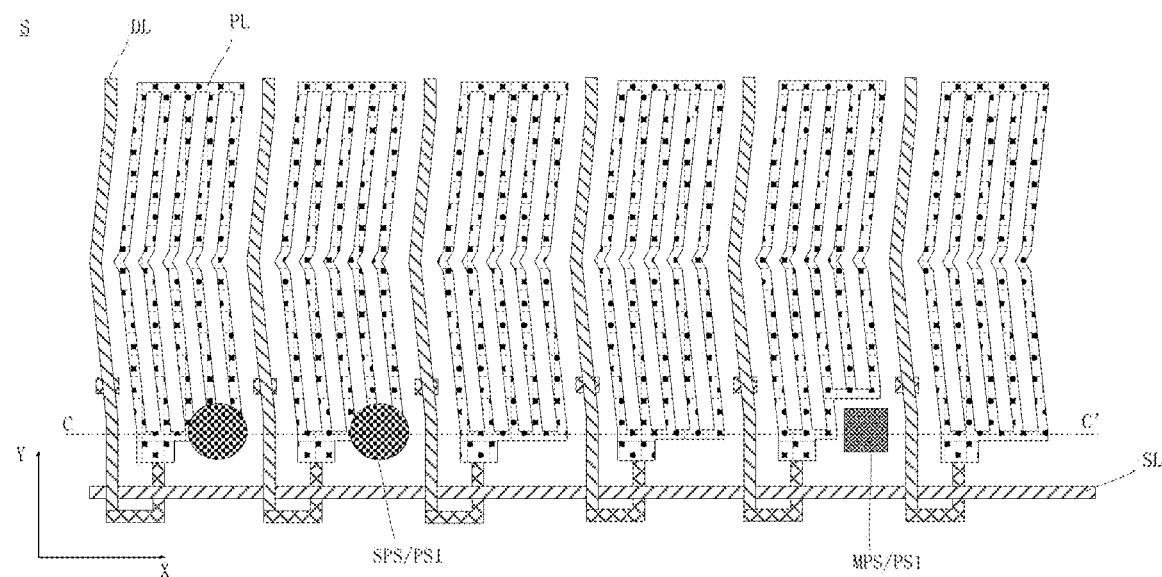
FIG. 10 is a schematic diagram of the area S of the display panel in FIG. 3 according to another embodiment of the present disclosure.
Figure 11:
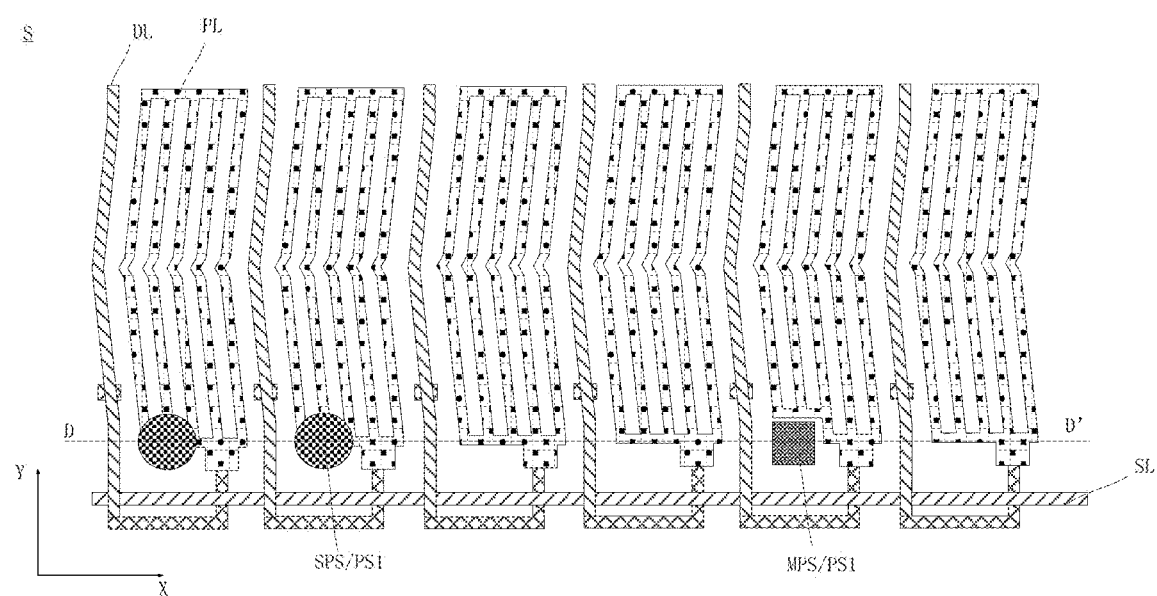
FIG. 11 is a schematic diagram of the area S of the display panel in FIG. 3 according to another embodiment of the present disclosure.
Figure 14:
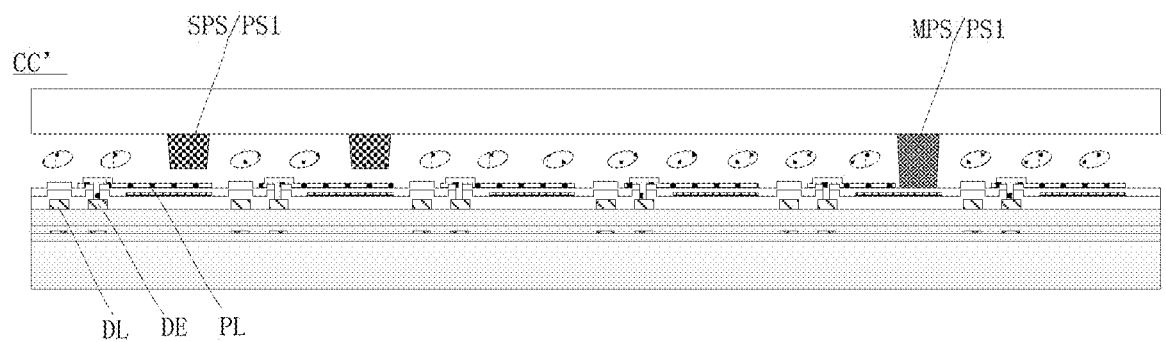
FIG. 14 is a cross-sectional view along a line C-C' shown in FIG. 10 according to an embodiment of the present disclosure.
Figure 15:
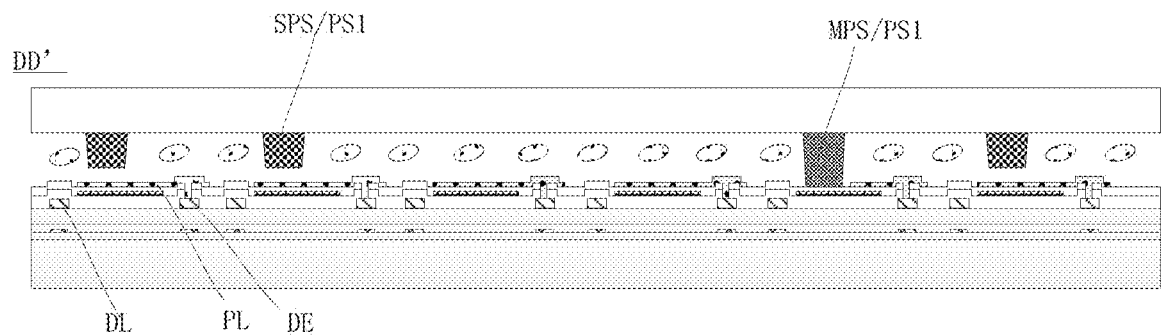
FIG. 15 is a cross-sectional view along a line D-D' shown in FIG. 11 according to an embodiment of the present disclosure.

FIG. 10 is a schematic diagram of the area S of the display panel in FIG. 3 according to another embodiment of the present disclosure; FIG. 11 is a schematic diagram of the area S of the display panel in FIG. 3 according to another embodiment of the present disclosure; FIG. 14 is a cross-sectional view along a line C-C' shown in FIG. 10 according to an embodiment of the present disclosure; and FIG. 15 is a cross-sectional view along a line D-D' shown in FIG. 11 according to an embodiment of the present disclosure. In some embodiments of the present disclosure, referring to FIG. 10, FIG. 11, FIG. 14 and FIG. 15, in a direction perpendicular to the plane of the display panel 1, among the first support pillars PS1 provided, the projection of the primary support pillar MPS does not overlap a projection of a pixel electrode PL, and the projection of the auxiliary support pillar SPS can overlap the projection of the pixel electrode PL. On the one hand, the projection of the primary support pillar MPS does not overlap the projection of the pixel electrode PL. In the display panel 1, the primary support pillar MPS plays a main supporting role, and therefore, the primary support pillar MPS needs to be supported in a flatter area compared to the auxiliary support pillar SPS. In order to enable the display panel 1 to obtain a strong driving electric field, the pixel electrode PL usually includes multiple branches, especially in the Fringe Field Switching (FFS) driving mode. The electric field between the pixel electrode PL and the common electrode of the whole surface is generated to drive the liquid crystal rotation. The pixel electrode PL has multiple branches, each branch can generate an effective fringe electric field, such that the display panel 1 has a strong driving electric field. Moreover, because the line width of a single branch of the pixel electrode PL is smaller than the support surface area of the primary support pillar MPS, if the primary support pillar MPS contacts with the branch of the pixel electrode PL, it means that the primary support pillar MPS can span multiple branches of the pixel electrode PL. Therefore, the projection of the primary support pillar MPS does not overlap the projection of the pixel electrode PL. In other words, the projection of the primary support pillar MPS does not overlap the projection of the pixel electrode PL with multiple branches, such that the primary support pillar MPS can be supported on a flatter layer, thus achieving the supporting performance of the display panel 1. On the other hand, the projection of the auxiliary support pillar SPS overlaps the projection of the pixel electrode PL. In the display panel 1, the auxiliary support pillar SPS mainly plays an auxiliary supporting role. That is, when the display panel 1 is not subjected to external forces, the auxiliary support pillar SPS does not contact the opposite substrate. Generally, the area density of the auxiliary support pillar SPS is greater than that of the primary support pillar MPS. That is, the number of pixel sub-units P1 provided with the auxiliary support pillars SPS is greater than the number of pixel sub-units P1 provided with the primary support pillars MPS, and a larger area of the pixel electrode PL in the pixel sub-unit P1 indicates a stronger electric field. Therefore, for the more pixel sub-units P1 provided with the auxiliary support pillars SPS, the projection of the auxiliary support pillar SPS overlaps the projection of the pixel electrode PL, such that the area of the pixel electrode PL of the display panel 1 can be enlarged, thus ensuring high display brightness of the display panel 1.

Figure 12:
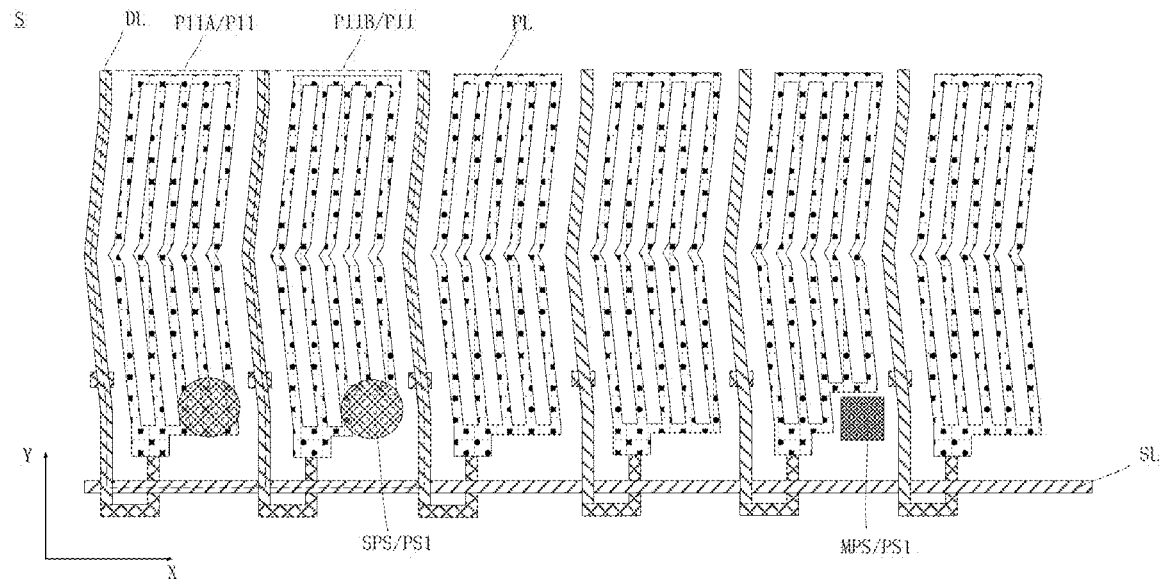
FIG. 12 is a schematic diagram of the area S of the display panel in FIG. 3 according to another embodiment of the present disclosure.
Figure 13:
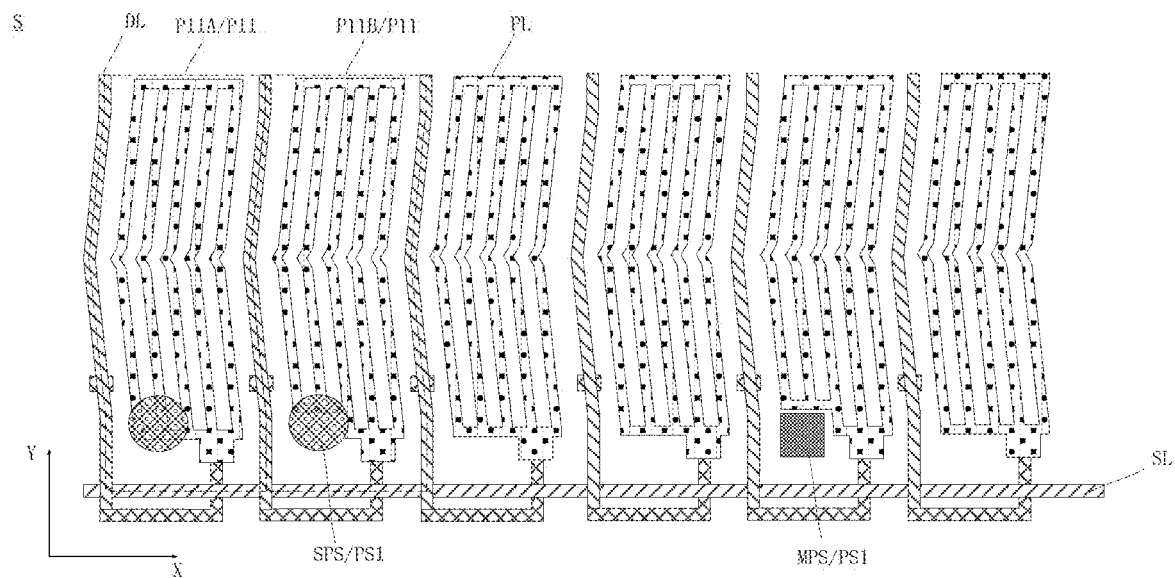
FIG. 13 is a schematic diagram of the area S of the display panel in FIG. 3 according to another embodiment of the present disclosure.

FIG. 12 is a schematic diagram of the area S of the display panel in FIG. 3 according to another embodiment of the present disclosure; and FIG. 13 is a schematic diagram of the area S of the display panel in FIG. 3 according to another embodiment of the present disclosure. In some embodiments of the present disclosure, referring to FIG. 12 and FIG. 13, the pixel sub-unit P1 includes a first pixel sub-unit P11. The first pixel sub-unit P11 includes a type-A first pixel sub-unit P11A and a type-B first pixel sub-unit P11B. In order to increase the area density of the auxiliary support pillars SPS in the first support pillars PS1, the auxiliary support pillars SPS can be disposed in the type-A first pixel sub-unit P11A and the type-B first pixel sub-unit P11B. In the direction perpendicular to the plane of the display panel 1, an overlapping area between the projection of the auxiliary support pillar SPS and the projection of the pixel electrode PL of the type-A first pixel sub-unit P11A is defined as S1, and an overlapping area between the projection of the auxiliary support pillar SPS and the projection of the pixel electrode PL of the type-B first pixel sub-unit P11B is defined as S2, S1≠S2. Because the display panel 1 usually includes red pixel sub-units, green pixel sub-units and blue pixel sub-units, when color display of the display panel 1 needs to be optimized, the settings of pixel electrodes PL corresponding to the red pixel sub-units, the green pixel sub-units, and the blue pixel sub-units can be inconsistent, so that the intensity of the electric fields generated by the pixel sub-units of three colors is inconsistent. When color matching of the display panel 1 is optimized, if the auxiliary support pillars SPS occupy in pixel sub-units of different colors, the overlapping areas between the auxiliary support pillars SPS and the pixel electrodes PL of the pixel sub-units of different colors can be different.

Further, referring to FIG. 12 and FIG. 13, when the projection of the primary support pillar MPS in the first support pillars PS1 overlaps the projection of the type-A first pixel sub-unit P11A, S1<S2. Since the projection of the primary support pillar MPS does not overlap the pixel electrode PL of the type-A first pixel sub-unit P11A, the pixel electrode PL of the type-A first pixel sub-unit P11A needs to avoid the primary support pillar MPS, which inevitably leads to the reduction of the projection area of the pixel electrode PL of the type-A first pixel sub-unit P11A. While the primary support pillar MPS is not disposed in the type-B first pixel sub-unit P11B, the projection area of the pixel electrode PL of the type-B first pixel sub-unit P11B is relatively large, so that when the auxiliary support pillar SPS overlaps the pixel electrodes PL of the type-A first pixel sub-unit P11A and the type-B first pixel sub-unit P11B, the overlapping area S1 with the pixel electrode PL of the type-A first pixel sub-unit P11A is smaller than the overlapping area S2 with the pixel electrode PL of the type-B first pixel sub-unit P11B. In this solution, the auxiliary support pillar SPS and the primary support pillar MPS occupy in the pixel sub-units P1 of the same type, when the primary support pillar MPS does not overlap the pixel electrode PL, the layout design of the primary support pillar MPS can be simplified. The pixel sub-units P1 of the same type refer to the same design of the pixel electrode PL. That is, the pixel unit, which usually contains at least three pixel sub-units P1, can be cyclically disposed to ensure uniform display of the display panel 1.

Figure 16:
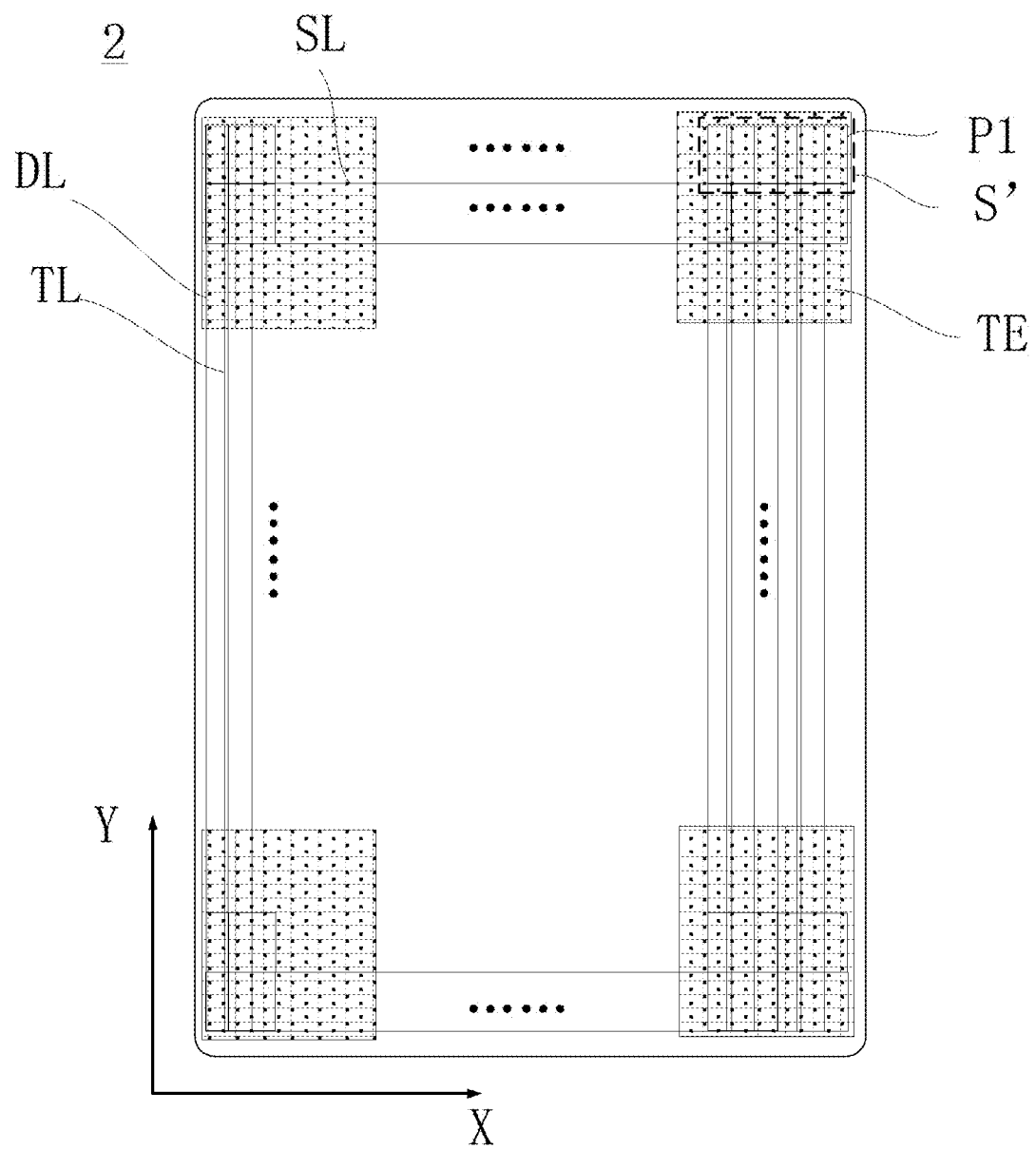
FIG. 16 is a schematic top view of another display panel according to an embodiment of the present disclosure.
Figure 17:
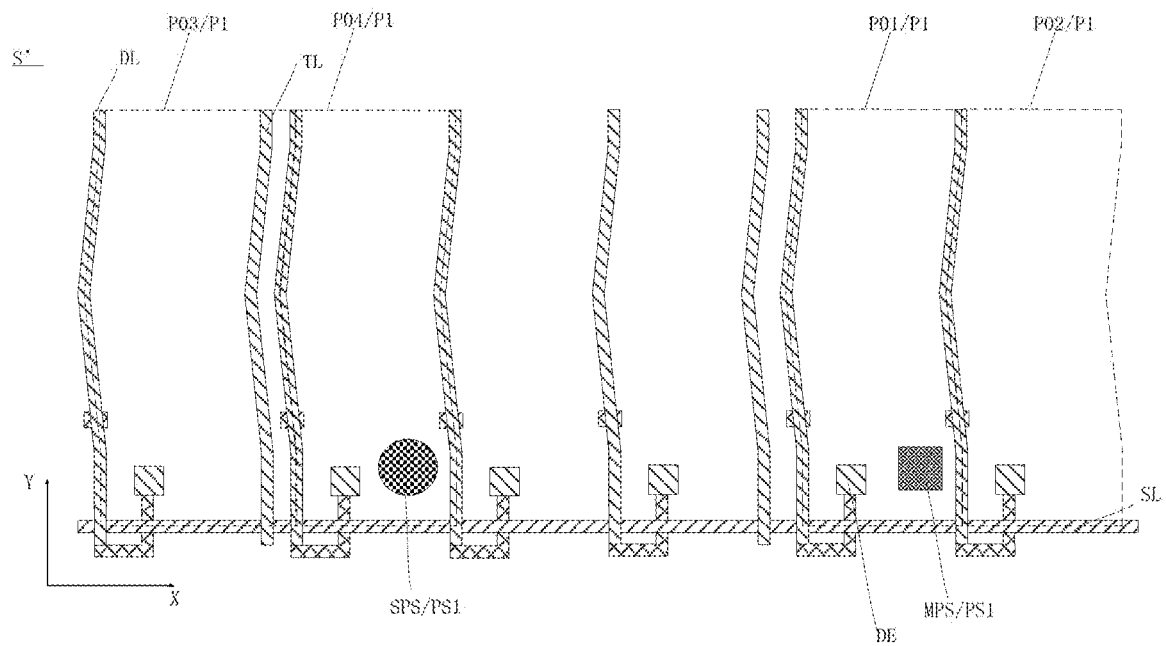
FIG. 17 is a schematic diagram of an area S' of the display panel in FIG. 16 according to an embodiment of the present disclosure.
Figure 18:
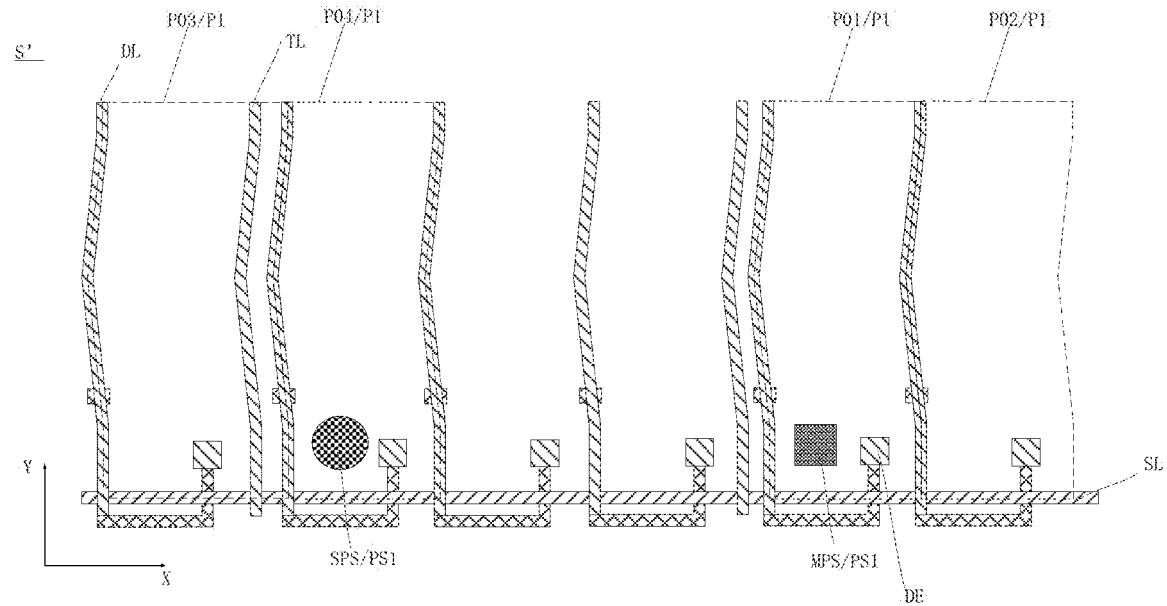
FIG. 18 is a schematic diagram of the area S' of the display panel in FIG. 16 according to another embodiment of the present disclosure.

FIG. 16 is a schematic top view of another display panel according to an embodiment of the present disclosure; FIG. 17 is a schematic diagram of an area S' of the display panel in FIG. 16 according to an embodiment of the present disclosure; and FIG. 18 is a schematic diagram of the area S' of the display panel in FIG. 16 according to another embodiment of the present disclosure. In some embodiments of the present disclosure, referring to FIG. 16 to FIG. 18, the display panel 2 further includes touch electrodes TE and touch lines TL. The touch line TL is electrically connected to the touch electrode TE, and the touch line TL and the data line DL can be located in a same metal layer. In a first direction X, pixel sub-units P1 include a first pixel sub-unit P01, a second pixel sub-unit P02, a third pixel sub-unit P03 and a fourth pixel sub-unit P04. The first pixel sub-unit P01 and the second pixel sub-unit P02 are adjacent to each other. The third pixel sub-unit P03 and the fourth pixel sub-unit P04 are adjacent to each other. The present disclosure does not limit the arrangement relationship between the first pixel sub-unit P01, the second pixel sub-unit P02, the third pixel sub-unit P03, and the fourth pixel sub-unit P04, that is, the first pixel sub-unit P01, the second pixel sub-unit P02, the third pixel sub-unit P03, and the fourth pixel sub-unit P04 can be arranged sequentially in the first direction X, or other pixel sub-units P1 can be disposed between the first pixel sub-unit P01 and the second pixel sub-unit P02 or between the third pixel sub-unit P03 and the fourth pixel sub-unit P04. Alternatively, as shown in FIG. 17 and FIG. 18, the first pixel sub-unit P01 can be the fourth pixel sub-unit P04, that is, the first pixel sub-unit P01 is reused as the fourth pixel sub-unit P04.

In the first direction X, a data line DL electrically connected to the second pixel sub-unit P02 is included between the drain DE of the first pixel sub-unit P01 and the drain DE of the second pixel sub-unit P02; not only a data line DL electrically connected to the fourth pixel sub-unit P04, but also a touch line TL are included between the drain DE of the third pixel sub-unit P03 and the drain DE of the fourth pixel sub-unit P04. In the direction perpendicular to the plane of the display panel 2, the projection of the primary support pillar MPS in the first support pillars PS1 overlaps the projection of the first pixel sub-unit P01. That is, in the first direction X, the projection of the primary support pillar MPS in the direction perpendicular to the plane of the display panel 2 is located between the projection of the data line DL electrically connected to the first pixel sub-unit P01 and the projection of the data line DL electrically connected to the second pixel sub-unit P02 in the direction perpendicular to the plane of the display panel 2. In the second direction Y, the projection of the primary support pillar MPS in the direction perpendicular to the plane of the display panel 2 is located at a side of the projection of the scan line SL connected to the first pixel sub-unit P01 in the direction perpendicular to the plane of the display panel 2. That is, the primary support pillar MPS is disposed in the area enclosed by two adjacent data lines DL and the scan line SL, and is disposed adjacent to the scan line SL. Further, the primary support pillar MPS is disposed avoiding the drain DE of the first pixel sub-unit 01. Since only the data line DL is included between the drain DE of the first pixel sub-unit P01 and the drain DE of the second pixel sub-unit P02, while the data line DL and the touch line TL are included between the drain DE of the third pixel sub-unit P03 and the drain DE of the fourth pixel sub-unit P04, when the touch line TL is electrically connected to the touch electrode TE via the through hole, there can be a through hole on the touch line TL. In other words, there is a through hole between the drain DE of the third pixel sub-unit P03 and the drain DE of the fourth pixel sub-unit P04, which greatly reduces the occupied supporting space of the primary support pillar MPS in the third pixel sub-unit P03. Therefore, it is not convenient to dispose the primary support pillar MPS in the third pixel sub-unit P03. In this way, by disposing the primary support pillar MPS in the first pixel sub-unit P01, the occupied space in the pixel sub-units P1 can be fully utilized, thereby ensuring the supporting capacity of the display panel 2. The above does not limit the position relationship between the second pixel sub-unit P02 and the third pixel sub-unit P03, that is, it does not limit whether there is a touch line TL between the drain DE of the second pixel sub-unit P02 and the drain of the third pixel sub-unit P03. When there is no touch line TL, the primary support pillar MPS can alternatively be disposed in the second pixel sub-unit P02, but when there is a touch line TL, the primary support pillar MPS is not disposed in the second pixel sub-unit P02.

In some embodiments of the present disclosure, at least some auxiliary support pillars SPS include the first primary support pillar PS1, that is, at least some auxiliary support pillars SPS are also disposed in the area enclosed by two adjacent data lines DL and the scan line SL, and are disposed adjacent to the scan line SL. Further, at least some auxiliary support pillars SPS are disposed avoiding the drain DE of the first pixel sub-unit P01, that is, the primary support pillar MPS and the auxiliary support pillar SPS are disposed at the same positions in the pixel sub-units P1, which is conducive to reducing the shading area of the black matrix and ensuring high brightness display of the display panel 2.

Figure 19:
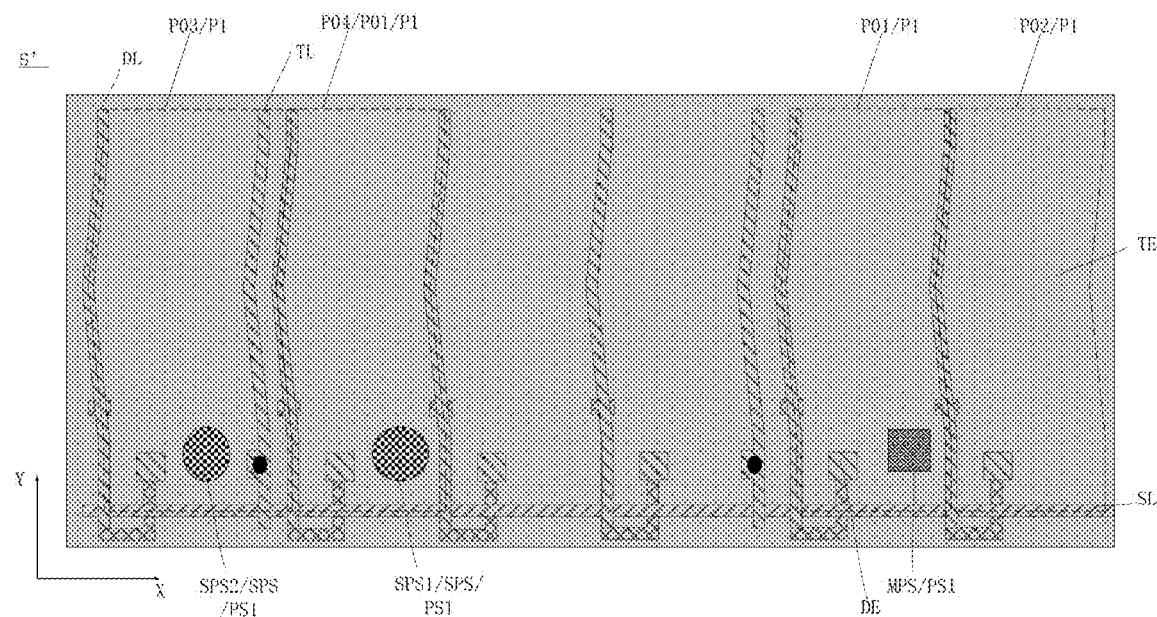
FIG. 19 is a schematic diagram of the area S' of the display panel in FIG. 16 according to another embodiment of the present disclosure.
Figure 20:
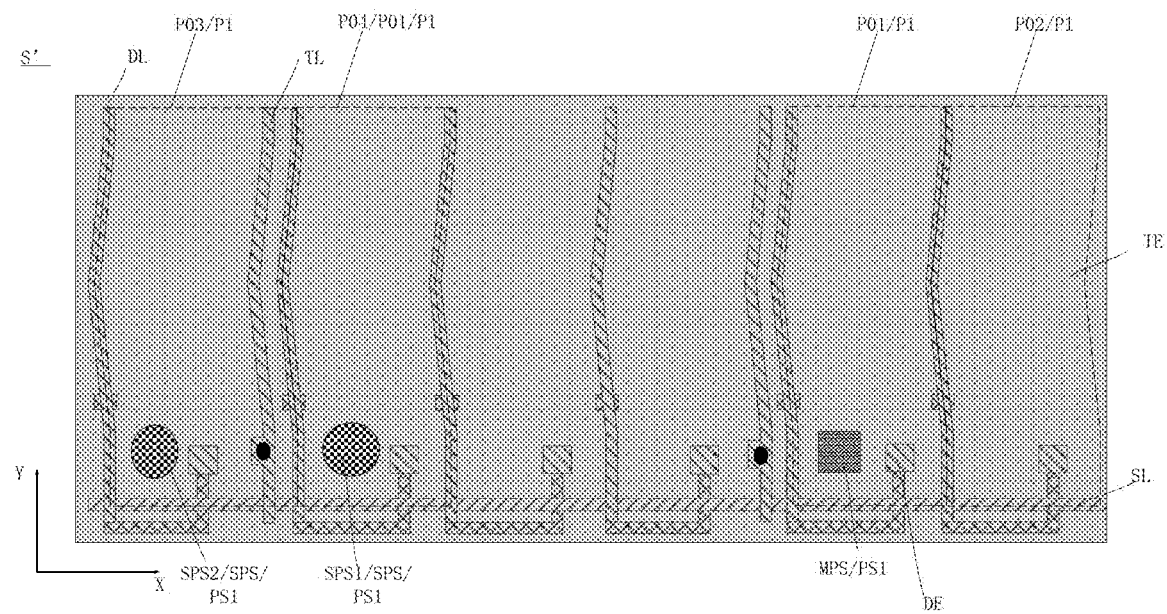
FIG. 20 is a schematic diagram of the area S' of the display panel in FIG. 16 according to another embodiment of the present disclosure.

FIG. 19 is a schematic diagram of the area S' of the display panel in FIG. 16 according to another embodiment of the present disclosure; and FIG. 20 is a schematic diagram of the area S' of the display panel in FIG. 16 according to another embodiment of the present disclosure. In some embodiments of the present disclosure, as shown in FIG. 19 and FIG. 20, the auxiliary support pillars SPS include a first auxiliary support pillar SPS1 and a second auxiliary support pillar SPS2. In the direction perpendicular to the plane of the display panel 2, the projection area of the first auxiliary support pillar SPS1 is larger than the projection area of the second auxiliary support pillar SPS2. In an embodiment of the present disclosure, in the first direction X, the projection size of the first auxiliary support pillar SPS1 is larger than the projection size of the second auxiliary support pillar SPS2. The projection of the first auxiliary support pillar SPS1 can overlap the projection of the first pixel sub-unit P01, and the projection of the second auxiliary support pillar SPS2 can overlap the projection of the third pixel sub-unit P03. To further increase the area density of the auxiliary support pillars SPS, the auxiliary support pillars SPS can include two types of auxiliary support pillars SPS, an auxiliary support pillar SPS with a larger projection area is disposed in the first pixel sub-unit P01 and an auxiliary support pillar SPS with a smaller projection area is disposed in the third pixel sub-unit P03. In other words, the second auxiliary support pillar SPS2 reduces its size in the first direction X to leave space for the electrical connection between the touch line TL and the touch electrode TE. The area density of the auxiliary support pillars SPS is increased to enhance the external force resistance of the display panel 2. Meanwhile, the occupied space in the pixel sub-units P1 is also fully utilized to ensure the supporting capacity of the display panel 2.

Figure 21:
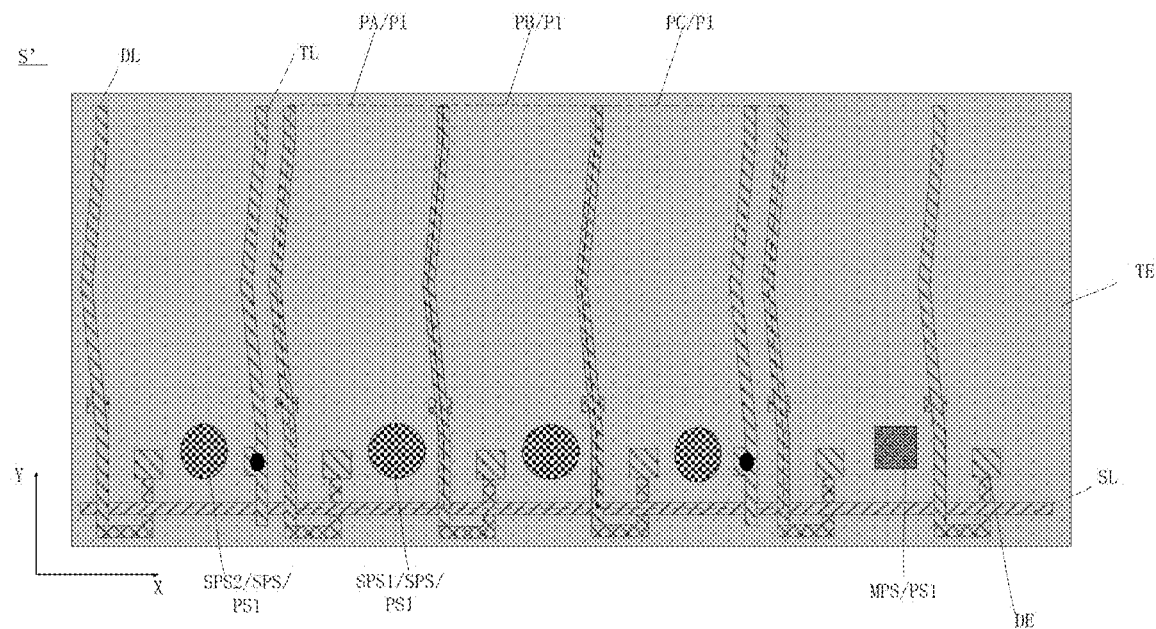
FIG. 21 is a schematic diagram of the area S' of the display panel in FIG. 16 according to another embodiment of the present disclosure.
Figure 22:
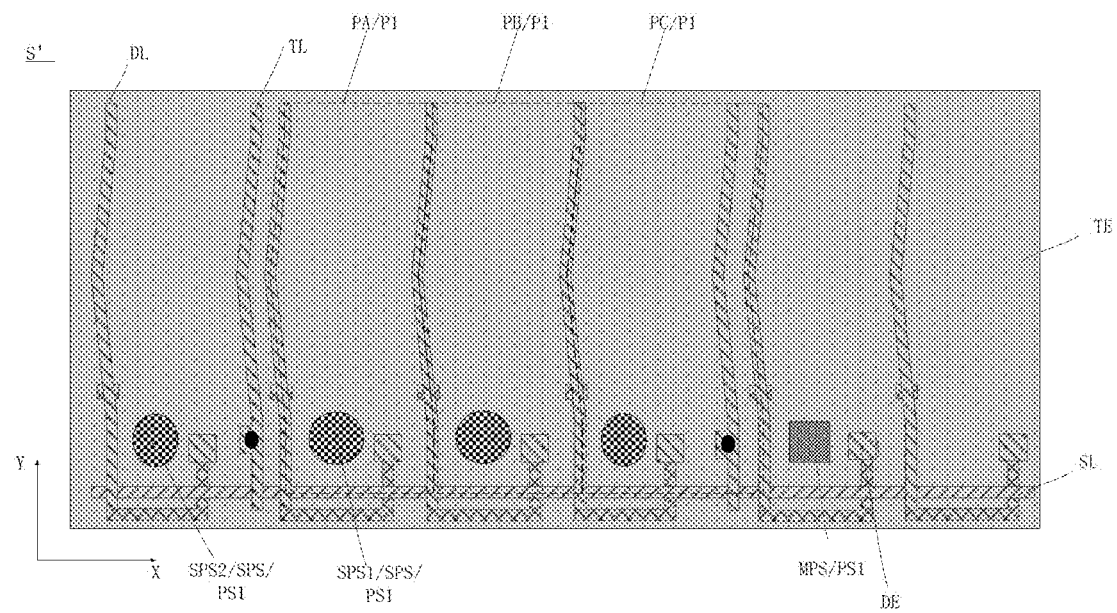
FIG. 22 is a schematic diagram of the area S' of the display panel in FIG. 16 according to another embodiment of the present disclosure.

Further, an embodiment of the present disclosure provides an arrangement manner of pixel sub-units P1. FIG. 21 is a schematic diagram of the area S' of the display panel in FIG. 16 according to another embodiment of the present disclosure; and FIG. 22 is a schematic diagram of the area S' of the display panel in FIG. 16 according to another embodiment of the present disclosure. As shown in FIG. 21 and FIG. 22, the pixel sub-units P1 include a first pixel sub-unit PA, a second pixel sub-unit PB, and a third pixel sub-unit PC that are sequentially disposed adjacent to one another in the first direction X, and the three pixel sub-units are cyclically provided. A data line DL electrically connected to the second pixel sub-unit PB is included between the drain DE of the first pixel sub-unit PA and the drain DE of the second pixel sub-unit PB, a data line DL electrically connected to the third pixel sub-unit PC is included between the drain DE of the second pixel sub-unit PB and the drain DE of the third pixel sub-unit PC, and a touch line TL and a data line DL electrically connected to the first pixel sub-unit PA are included between the drain DE of the third pixel sub-unit PC and the drain DE of the first pixel sub-unit PA. In the direction perpendicular to the plane of the display panel 2, the projection of the primary support pillar MPS in the first support pillars PS1 can overlap the projection of the first pixel sub-unit PA, or overlap the projection of the second pixel sub-unit PB, or partially overlap the projection of the first pixel sub-unit PA and partially overlap the projection of the second pixel sub-unit PB. Since a touch line TL is disposed between the third pixel sub-unit PC and the first pixel sub-unit PA, and the touch line TL can be provided with a through hole electrically connecting to the touch electrode DE, the space, in the third pixel sub-unit PC, used for disposing the primary support pillar MPS is greatly occupied. In this way, the projection overlapping between the primary support pillar MPS and the first pixel sub-unit PA and/or the second pixel sub-unit PB can make full use of the occupied space in the pixel sub-unit P1, thus ensuring the supporting capacity of the display panel 2.

Further, referring to FIG. 21 and FIG. 22, at least some auxiliary support pillars SPS include the first primary support pillar PS1, and the auxiliary support pillars SPS include a first auxiliary support pillar SPS1 and a second auxiliary support pillar SPS2. In the direction perpendicular to the plane of the display panel 2, the projection area of the first auxiliary support pillar SPS1 is larger than the projection area of the second auxiliary support pillar SPS2. In an embodiment of the present disclosure, in the first direction X, the projection size of the first auxiliary support pillar SPS1 is larger than the projection size of the second auxiliary support pillar SPS2. The projection of the first auxiliary support pillar SPS1 can overlap the projection of the first pixel sub-unit PA, or overlap the projection of the second pixel sub-unit PB, or partially overlap the projection of the first pixel sub-unit PA and partially overlap the projection of the second pixel sub-unit PB. The projection of the second auxiliary support pillar SPS2 overlaps the projection of the third pixel sub-unit PC. To further increase the area density of the auxiliary support pillars SPS, the auxiliary support pillars SPS can include two types of auxiliary support pillars SPS, an auxiliary support pillar SPS with a larger projection area is disposed in the first pixel sub-unit PA and/or the second pixel sub-unit PB, and an auxiliary support pillar SPS with a smaller projection area is disposed in the third pixel sub-unit PC. In other words, the second auxiliary support pillar SPS2 reduces its size in the first direction X to leave space for the electrical connection between the touch line TL and the touch electrode TE. The area density of the auxiliary support pillars SPS is increased while the occupied space in the pixel sub-units P1 is fully utilized, ensuring the supporting capacity of the display panel 2.

Figure 23:
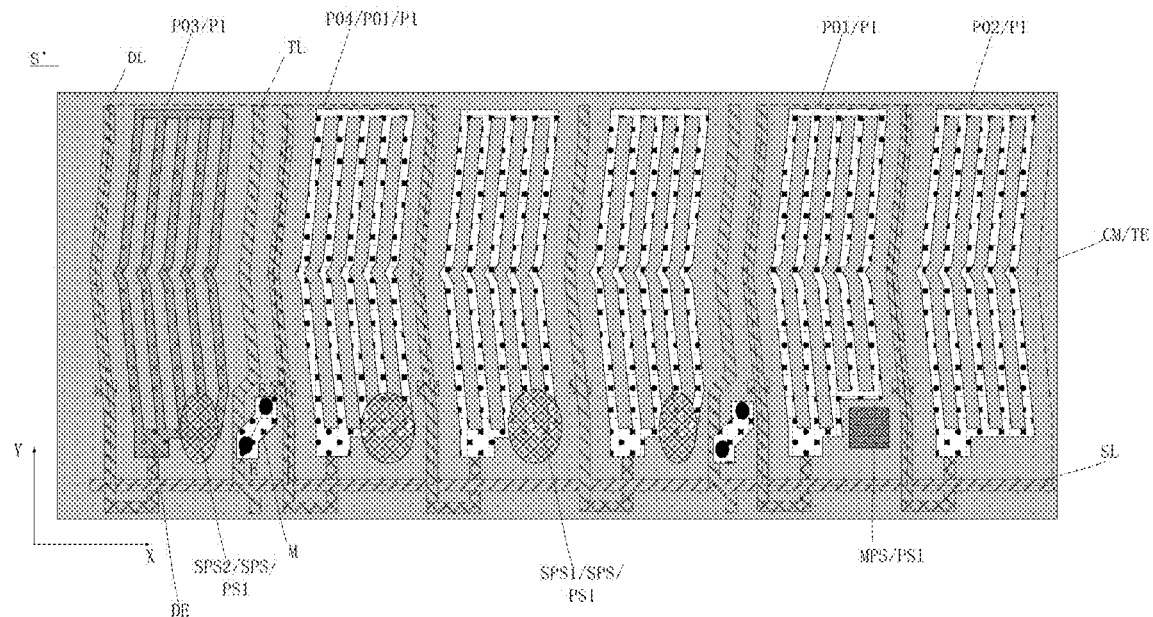
FIG. 23 is a schematic diagram of the area S' of the display panel in FIG. 16 according to another embodiment of the present disclosure.
Figure 25:
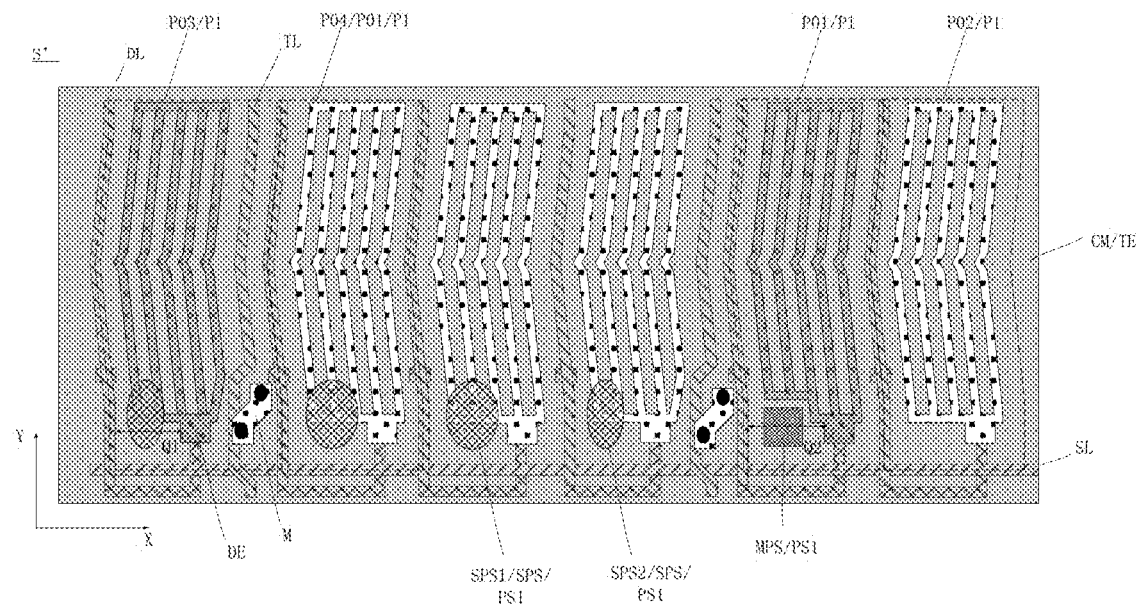
FIG. 25 is a schematic diagram of the area S' of the display panel in FIG. 16 according to another embodiment of the present disclosure.
Figure 27:
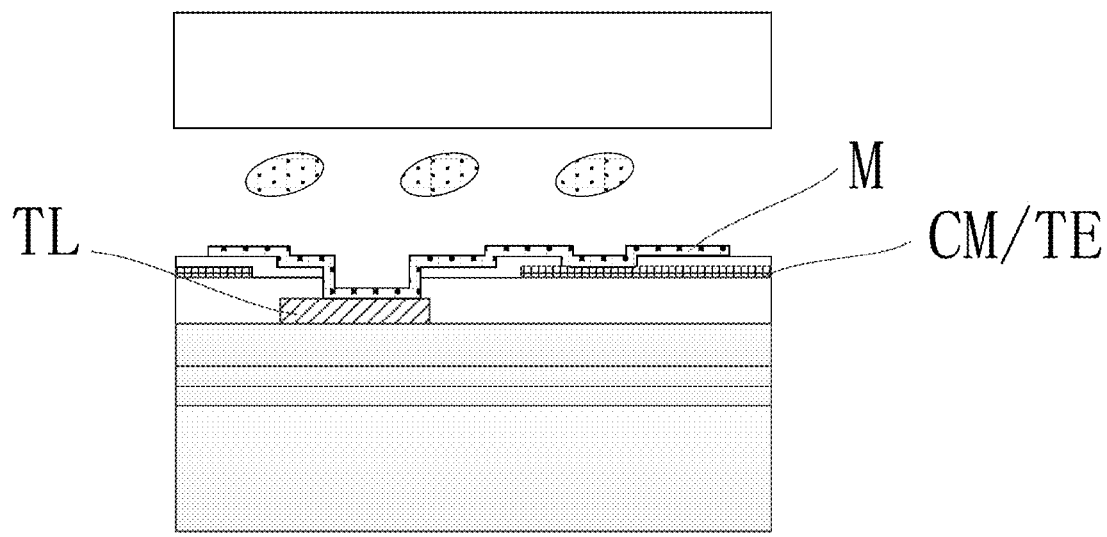
FIG. 27 is a cross-sectional view along a line E-E' shown in FIG. 23 according to an embodiment of the present disclosure.

FIG. 23 is a schematic diagram of the area S' of the display panel in FIG. 16 according to another embodiment of the present disclosure; FIG. 25 is a schematic diagram of the area S' of the display panel in FIG. 16 according to another embodiment of the present disclosure; and FIG. 27 is a cross-sectional view along a line E-E' shown in FIG. 23 according to an embodiment of the present disclosure. In some embodiments of the present disclosure, referring to FIG. 23, FIG. 25 and FIG. 27, the display panel 2 further includes a common electrode CM and a bridging layer M. The common electrode CM can be reused as the touch electrode TE, and the bridging layer M is electrically connected to the common electrode CM and the touch line TL, achieving electrical connection between the common electrode CM and the touch line TL. The bridging layer M can be located in the same layer as the pixel electrode PL layer, that is, the two are prepared using the same photolithography process. In some embodiments of the present disclosure, based on the arrangement manner of the pixel sub-units P1 provided in the present disclosure, in the first direction X, the pixel sub-units P1 of the display panel 2 include a first pixel sub-unit P01, a second pixel sub-unit P02, a third pixel sub-unit P03 and a fourth pixel sub-unit P04. The first pixel sub-unit P01 and the second pixel sub-unit P02 are adjacent to each other. The third pixel sub-unit P03 and the fourth pixel sub-unit P04 are adjacent to each other. In the first direction X, a data line DL electrically connected to the second pixel sub-unit P02 is included between the drain DE of the first pixel sub-unit P01 and the drain DE of the second pixel sub-unit P02, and a touch line TL and a data line DL electrically connected to the fourth pixel sub-unit P04 are included between the drain DE of the third pixel sub-unit P03 and the drain DE of the fourth pixel sub-unit P04. In the direction perpendicular to the plane of the display panel 2, a projection of the bridging layer M can be located between the projection of the drain DE of the third pixel sub-unit P03 and the projection of the data line DL electrically connected to the fourth pixel sub-unit P04. Further, when the auxiliary support pillars SPS of the display panel 2 include the second auxiliary support pillar SPS2, the projection of the bridging layer M can be located between the projection of the second auxiliary support pillar SPS2 and the projection of the data line DL electrically connected to the fourth pixel sub-unit P04. The drain DE of the third pixel sub-unit P03, the second auxiliary support pillar SPS2, and the bridging layer M are arranged along the first direction X, such that the space of the pixel sub-units P1 can be fully utilized, and the black matrix above the scan line SL can be fully utilized for shading, so that the space covered by the black matrix is reduced, thereby improving the transmittance of the display panel 2.

Figure 24:
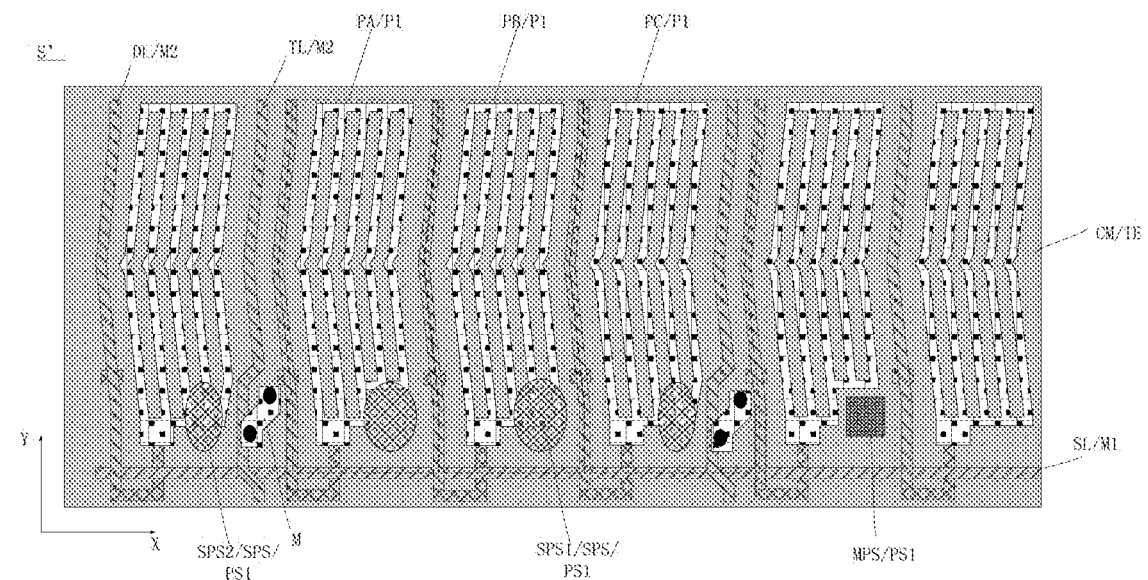
FIG. 24 is a schematic diagram of the area S' of the display panel in FIG. 16 according to another embodiment of the present disclosure.
Figure 26:
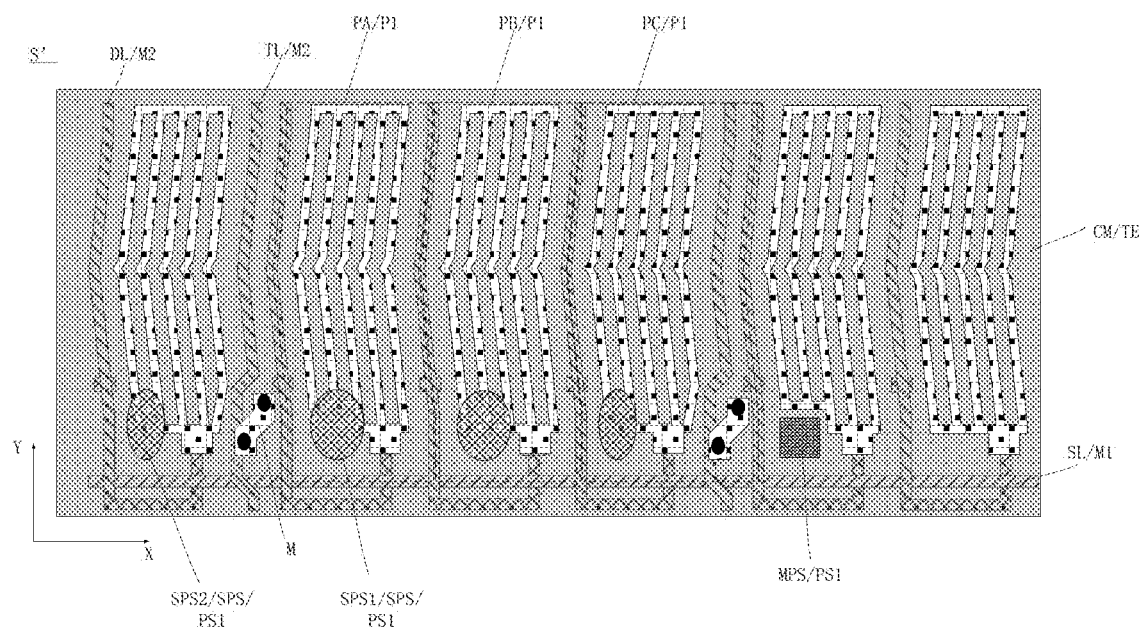
FIG. 26 is a schematic diagram of the area S' of the display panel in FIG. 16 according to another embodiment of the present disclosure.

FIG. 24 is a schematic diagram of the area S' of the display panel in FIG. 16 according to another embodiment of the present disclosure; and FIG. 26 is a schematic diagram of the area S' of the display panel in FIG. 16 according to another embodiment of the present disclosure. In some embodiments of the present disclosure, as shown in FIG. 24 and FIG. 26, based on another arrangement manner of pixel sub-units P1 provided in the present disclosure, the pixel sub-units P1 include the first pixel sub-unit PA, the second pixel sub-unit PB, and the third pixel sub-unit PC that are sequentially disposed adjacent to one another the first direction X, and the three pixel sub-units are cyclically provided. The data line DL electrically connected to the second pixel sub-unit PB is included between the drain DE of the first pixel sub-unit PA and the drain DE of the second pixel sub-unit PB, the data line DL electrically connected to the third pixel sub-unit PC is included between the drain DE of the second pixel sub-unit PB and the drain DE of the third pixel sub-unit PC, and the touch line TL and the data line DL electrically connected to the first pixel sub-unit PA are included between the drain DE of the third pixel sub-unit PC and the drain DE of the first pixel sub-unit PA. In the direction perpendicular to the plane of the display panel 2, a projection of the bridging layer M can be located between the projection of the drain DE of the third pixel sub-unit PC and the projection of the data line DL electrically connected to the first pixel sub-unit PA. Further, when the auxiliary support pillars SPS of the display panel 2 include the second auxiliary support pillar SPS2, the projection of the bridging layer M can be located between the projection of the second auxiliary support pillar SPS2 and the projection of the data line DL electrically connected to the first pixel sub-unit PA. The drain DE of the third pixel sub-unit P03, the second auxiliary support pillar SPS2, and the bridging layer M are arranged along the first direction X, such that the space of the pixel sub-units P1 can be fully utilized, and the black matrix above the scan line SL can be fully utilized for shading, so that the space covered by the black matrix is reduced, thereby improving the transmittance of the display panel 2.

In some embodiments of the present disclosure, referring to FIG. 25, in the direction perpendicular to the plane of the display panel 2, when the projection of the first auxiliary support pillar SPS1 and the projection of the second auxiliary support pillar SPS2 are located between the projection of the drain DE of the pixel sub-unit P1 and the projection of the data line DL electrically connected to the pixel sub-unit P1, a distance in the first direction X between the projection of the data line DL electrically connected to the pixel sub-unit P1 and the projection of the drain DE corresponding to the pixel sub-unit P1, such as the third pixel sub-unit P03, that overlaps the projection of the second auxiliary support pillar SPS2 is defined as Q1, a distance in the first direction X between the projection of the data line DL electrically connected to the pixel sub-unit P1 and the projection of the drain DE corresponding to the pixel sub-unit P1, such as the first pixel sub-unit P01, that overlaps the projection of the first auxiliary support pillar SPS1 is defined as Q2, and Q1<Q2. When the projection of the first auxiliary support pillar SPS1 and the projection of the second auxiliary support pillar SPS2 are located between the projection of the drain DE of the pixel sub-unit P1 and the projection of the data line DL electrically connected to the pixel sub-unit P1, the distance between the drain DE of the pixel sub-unit P1 and the data line DL needs to be increased, so as to place the auxiliary support pillars SPS. In some embodiments of the present disclosure, Q1 corresponding to the third pixel sub-unit P03 is set to be smaller than Q2 corresponding to the first pixel sub-unit P01. On the one hand, the support area of the second auxiliary support pillar SPS2 is relatively small, and the distance between the drain DE and the data line DL corresponding to the third pixel sub-unit P03 is reasonably extended based on the support area of the second auxiliary support pillar SPS2, and the extended distance is smaller than the distance between the drain DE and the data line DL corresponding to the first pixel sub-unit P01, such that the distance between the drain DE and the touch line TL of the third pixel sub-unit P03 can be increased, facilitating process preparation. On the other hand, reducing the extension of the distance between the drain DE and the data line DL corresponding to the third pixel sub-unit P03 leaves a preset space for the electrical connection manner between the touch line TL and the touch electrode TE, such as through the bridging layer M, thereby facilitating reasonable placement.

In some embodiments of the present disclosure, as shown in FIG. 24 and FIG. 26, in the direction perpendicular to the plane of the display panel 2, in the first support pillars PS1, the projection of the primary support pillar MPS does not overlap the projection of the pixel electrode PL. The auxiliary support pillars SPS include the first auxiliary support pillar SPS1 and the second auxiliary support pillar SPS2. The projection area of the first auxiliary support pillar SPS1 is larger than the projection area of the second auxiliary support pillar SPS2. Therefore, when the projections of the auxiliary support pillars SPS overlap the projection of the pixel electrode PL, there are at least two different overlapping areas. That is, the overlapping area between the projection of the first auxiliary support pillar SPS1 and the projection of the pixel electrode PL is defined as S3, the overlapping area between the projection of the second auxiliary support pillar SPS2 and the projection of the pixel electrode PL is defined as S4, and S3 is not equal to S4. On the one hand, the projection of the primary support pillar MPS does not overlap the projection of the pixel electrode PL. The primary support pillar MPS plays a main supporting role, and therefore, the primary support pillar MPS needs to be supported in a flatter area compared to the auxiliary support pillar SPS. In order to enable the display panel 2 to obtain a strong driving electric field, the pixel electrode PL usually includes multiple branches, especially in the FFS driving mode. The electric field between the pixel electrode PL and the common electrode of the whole surface is generated to drive the liquid crystal rotation. The pixel electrode PL has multiple branches, each branch can generate an effective fringe electric field, such that the display panel 2 has a strong driving electric field. Moreover, because the line width of a single branch of the pixel electrode PL is smaller than the support surface area of the primary support pillar MPS, if the primary support pillar MPS contacts the branch of the pixel electrode PL, it means that the primary support pillar MPS can span multiple branches of the pixel electrode PL. Therefore, the projection of the primary support pillar MPS does not overlap the projection of the pixel electrode PL. In other words, the projection of the primary support pillar MPS does not overlap the projection of the pixel electrode PL with multiple branches, such that the primary support pillar MPS can be supported on a flatter layer, thus achieving the supporting performance of the display panel 2. On the other hand, the projection of the auxiliary support pillar SPS overlaps the projection of the pixel electrode PL. In the display panel 1, the auxiliary support pillar SPS mainly plays an auxiliary supporting role. That is, when the display panel 1 is not subjected to external forces, the auxiliary support pillar SPS does not contact the opposite substrate. Generally, the area density of the auxiliary support pillar SPS is greater than that of the primary support pillar MPS, to ensure good cushioning and supporting capacity when the display panel 2 is subjected to external forces. Therefore, the number of pixel sub-units P1 provided with the auxiliary support pillars SPS is greater than the number of pixel sub-units P1 provided with the primary support pillars MPS, and a larger area of the pixel electrode PL in the pixel sub-unit P1 indicates a stronger electric field. Therefore, for the more pixel sub-units P1 provided with the auxiliary support pillars SPS, the projection of the auxiliary support pillar SPS overlaps the projection of the pixel electrode PL, such that the area of the pixel electrode PL of the display panel 2 can be enlarged, thus ensuring high display brightness of the display panel 2. Further, the auxiliary support pillars SPS include the first auxiliary support pillar SPS1 and the second auxiliary support pillar SPS2, so as to increase the support area of the auxiliary support pillars SPS and increase the supporting capacity of the display panel 2. Moreover, the overlapping area between the first auxiliary support pillar SPS1 and the pixel electrode PL is different from that between the second auxiliary support pillar SPS2 and the pixel electrode PL. Due to the different areas of the first auxiliary support pillar SPS1 and the second auxiliary support pillar SPS2, the occupied space in different pixel sub-units P1 can be fully utilized to match the auxiliary support pillars SPS of different areas, thus achieving the full utilization of the occupied space on the display panel 2.

In some embodiments of the present disclosure, referring to FIG. 24 and FIG. 26, in the direction perpendicular to the plane of the display panel 2, the overlapping areas between the projections of the first auxiliary support pillars SPS1 and the projection of the pixel electrode PL include two types of S31 and S32, and S31≠S32. Because the display panel 2 usually includes red pixel sub-units, green pixel sub-units, and blue pixel sub-units, when the color display of the display panel 2 needs to be optimized, the settings of pixel electrodes PL corresponding to the red pixel sub-units, the green pixel sub-units, and blue pixel sub-units can be inconsistent, so that the intensity of the electric fields generated by the pixel sub-units of three colors is inconsistent, thereby optimizing color matching of the display panel 2. When the auxiliary support pillars SPS occupy in pixel sub-units of different colors, the overlapping areas between the auxiliary support pillar SPS and the pixel electrodes PL of the pixel sub-units of different colors can be different.

Further, referring to FIG. 24 and FIG. 26, when the projection of the primary support pillar MPS in the first primary support pillars PS1 overlap the projection of the pixel sub-unit P1, since the projection of the primary support pillar MPS does not overlap the projection of the pixel electrode PL in the pixel sub-unit P1, the pixel electrode PL in the pixel sub-unit P1 needs to avoid the primary support pillar MPS, which inevitably leads to the reduction of the projection area of the pixel electrode PL in the pixel sub-unit P1. When the first auxiliary support pillar SPS1 overlaps pixel electrodes PL in two pixel sub-units P1, one of them is the same as the pixel electrode PL in the pixel sub-unit P1 where the primary support pillar MPS is disposed. In this case, the pixel electrode PL in this pixel sub-unit P1 needs to avoid the primary support pillar MPS, and the area of the pixel electrode PL is relatively reduced. Therefore, the overlapping areas between the projections of the first auxiliary support pillars SPS and the pixel electrode PL include S31 and S32, and S31/S32. In this solution, the auxiliary support pillar SPS and the primary support pillar MPS occupy in the pixel sub-units P1 of the same type, when the primary support pillar MPS does not overlap the pixel electrode PL, the layout design of the primary support pillar MPS can be simplified. The pixel sub-units P1 of the same type refer to the same design of the pixel electrode PL. That is, the pixel unit, which usually contains at least three pixel sub-units P1, can be cyclically disposed to ensure uniform display of the display panel 2.

In some embodiments of the present disclosure, referring to FIG. 24 and FIG. 26, the display panel 2 includes at least one metal layer, such as a first metal layer M1 where the scan line SL is located, and a second metal layer M2 where the data line DL and the touch line TL are located. In some embodiments of the present disclosure, the display panel 2 can further include a shading metal layer (not shown in the drawings), and the shading metal layer is used to shade the channel of the thin film transistor to avoid the leakage of the carrier caused by the backlight irradiation. In some embodiments of the present disclosure, the display panel 2 can further include a third metal layer M3 or the like. In the direction perpendicular to the plane of the display panel 2, the projection of the first support pillar PS1 does not overlap a projection of any metal layer on the display panel 2, that is, the first support pillar PS1 does not overlap the scan line SL, the data line DL, and the touch line TL, as well as other metal layers. This further ensures that the first support pillar PS1 abuts against a flat surface, forming a good support for the display panel 2 and avoiding abnormal display due to poor support when the display panel 2 is subjected to impact of external forces.

Figure 28:
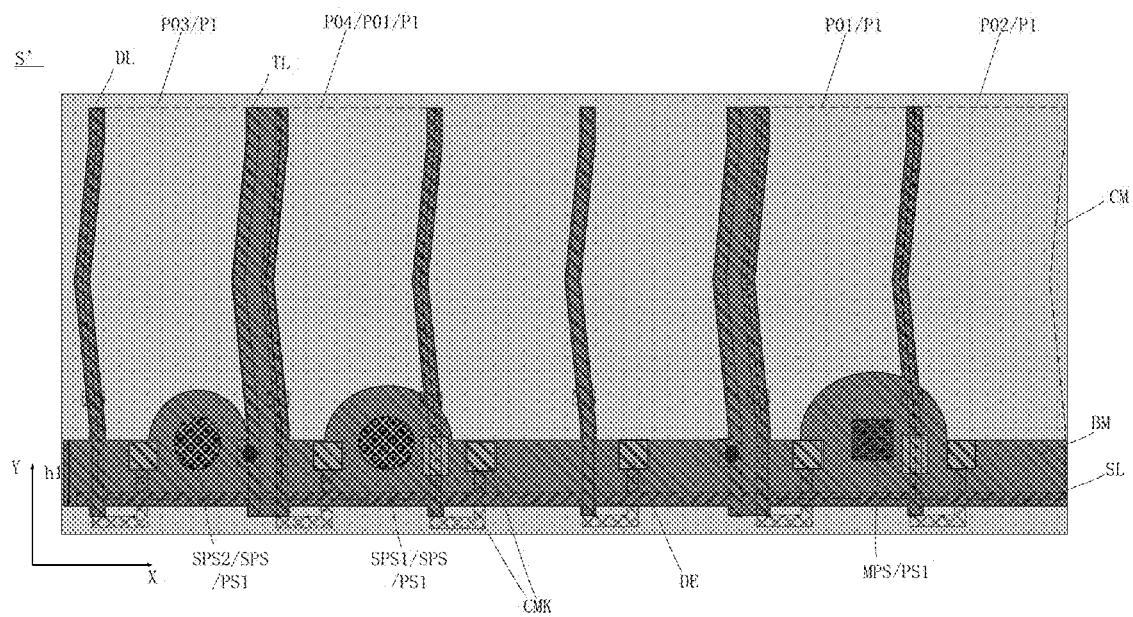
FIG. 28 is a schematic diagram of the area S' of the display panel in FIG. 16 according to another embodiment of the present disclosure.
Figure 29:
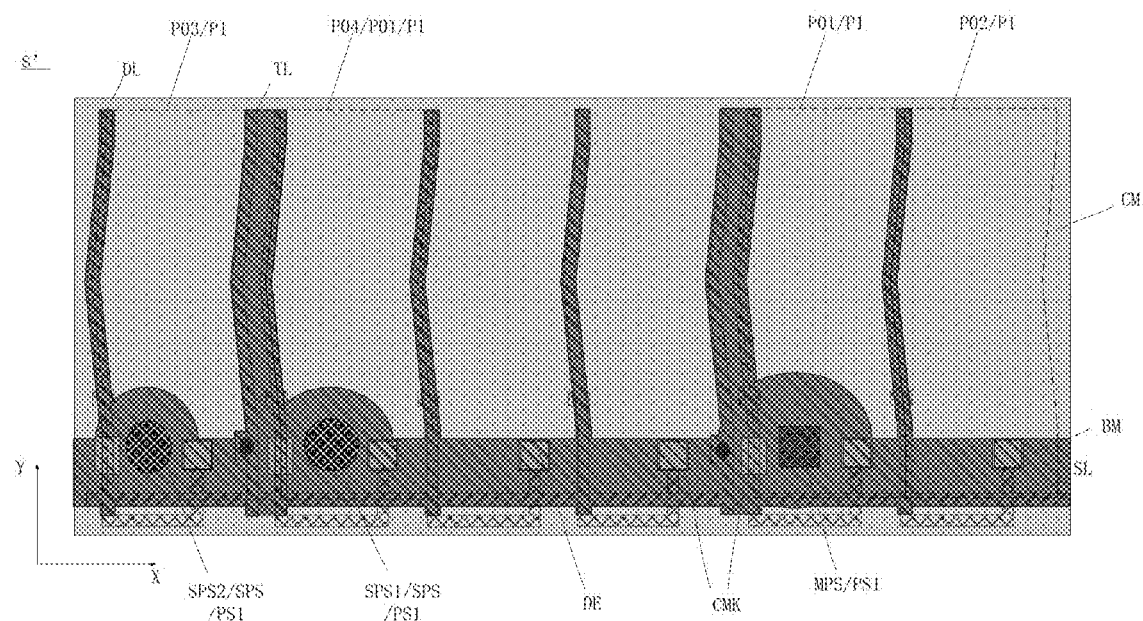
FIG. 29 is a schematic diagram of the area S' of the display panel in FIG. 16 according to another embodiment of the present disclosure.
Figure 30:
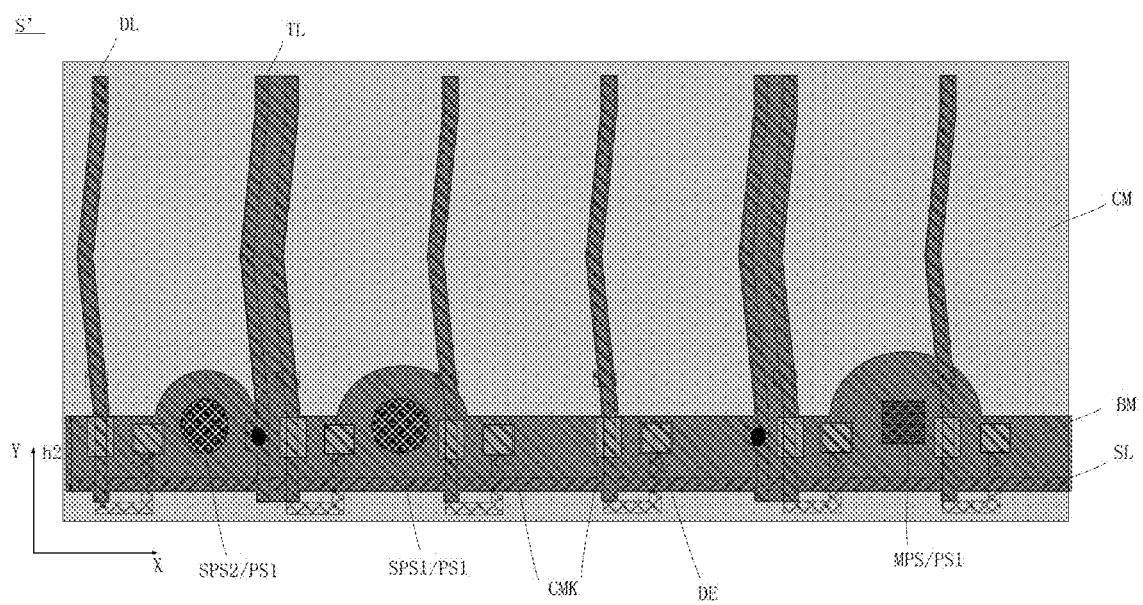
FIG. 30 is a schematic diagram of the area S' of the display panel in FIG. 16 according to another embodiment of the present disclosure.

FIG. 28 is a schematic diagram of the area S' of the display panel in FIG. 16 according to another embodiment of the present disclosure; FIG. 29 is a schematic diagram of the area S' of the display panel in FIG. 16 according to another embodiment of the present disclosure; and FIG. 30 is a schematic diagram of the area S' of the display panel in FIG. 16 according to another embodiment of the present disclosure. In some embodiments of the present disclosure, as shown in FIG. 28 to FIG. 30, the display panel 2 includes a common electrode CM, the common electrode CM includes a hollow portion CMK. In the direction perpendicular to the plane of the display panel 2, the projection of the hollow portion CMK overlaps the projection of the drain DE of any pixel sub-unit P1, and the hollow portion CMK overlaps data lines DL electrically connected to at least some pixel sub-units P1. The color film substrate 20 includes a black matrix BM, the projection of the black matrix BM covers the scan line SL, the data line DL, and the touch line TL, as well as the hollow portion CMK. The hollow portion CMK of the common electrode CM overlaps the drain DE of the pixel sub-unit P1. When the pixel electrode PL of the display panel 2 is located at a side of the common electrode CM away from the drain DE, the pixel electrode PL needs to be electrically connected to the drain DE. Therefore, the common electrode CM is hollowed to facilitate the connection between the pixel electrode PL and the drain DE and avoid short circuit between the pixel electrode PL and the common electrode CM. The hollow portion CMK of the common electrode CM overlaps data lines DL of at least some pixel sub-units P1, to reduce the parasitic capacitance formed with the data lines DL of at least some pixel sub-units P 1, thus improving the charging capability of the thin film transistor. However, because there is no common electrode CM in the hollow portion CMK to shade the data line DL, in order to prevent the liquid crystal above the data line DL from rotating when the data line DL is used for charging and causing light leakage, it is necessary to dispose the black matrix BM to shade the hollow portion CMK, thus avoiding light leakage and ensuring normal display of the display panel 2.

As shown in FIG. 28 and FIG. 29, the hollow portion CMK of the common electrode CM overlaps the data line DL of some pixel sub-units P1. As shown in FIG. 30, the hollow portion CMK of the common electrode CM overlaps the data line DL of any pixel sub-unit P1. This portion can be adjusted according to the position of the outward expansion of the black matrix BM of the display panel 2.

In some embodiments of the present disclosure, referring to FIG. 28, based on the arrangement manner of the pixel sub-units P1 provided in the present disclosure, in the first direction X, the pixel sub-units P1 of the display panel 2 include a first pixel sub-unit P01, a second pixel sub-unit P02, a third pixel sub-unit P03 and a fourth pixel sub-unit P04. The first pixel sub-unit P01 and the second pixel sub-unit P02 are adjacent to each other. The third pixel sub-unit P03 and the fourth pixel sub-unit P04 are adjacent to each other. In the first direction X, a data line DL electrically connected to the second pixel sub-unit P02 is included between the drain DE of the first pixel sub-unit P01 and the drain DE of the second pixel sub-unit P02, and a touch line TL and a data line DL electrically connected to the fourth pixel sub-unit P04 are included between the drain DE of the third pixel sub-unit P03 and the drain DE of the fourth pixel sub-unit P04. The auxiliary support pillars SPS include a first auxiliary support pillar SPS1 and a second auxiliary support pillar SPS2. Among the first support pillars SPS, in the direction perpendicular to the plane of the display panel 2, the projection of the first auxiliary support pillar SPS1 is located between the projection of the drain DE of the first pixel sub-unit P01 and the projection of the data line DL electrically connected to the second pixel sub-unit P02, and the projection of the second auxiliary support pillar SPS2 is located between the projection of the drain DE of the third pixel sub-unit P03 and the projection of the data line DL electrically connected to the fourth pixel sub-unit P04, so that the projection of the hollow portion CMK does not overlap the projection of the data line DL electrically connected to the fourth pixel sub-unit P04, that is, the hollow portion CMK is not disposed above the data line DL electrically connected to the fourth pixel sub-unit P04.

The data line DL electrically connected to the fourth pixel sub-unit P04 and the touch line TL are included between the drain DE of the third pixel sub-unit P03 and the drain DE of the fourth pixel sub-unit P04, the second auxiliary support pillar SPS2 occupies between the drain DE of the third pixel sub-unit P03 and the touch line TL, and the second auxiliary support pillar SPS2 has a small support area. In order to prevent liquid crystal disturbance around the support pillar from affecting the display uniformity of the display panel 2 when pressed, the area covered by black matrix BM is expanded outward from the area in which the support pillar is located. Because the second auxiliary support pillar SPS2 has a relatively small area, the outward expansion range of the black matrix BM is also small. The touch line TL is also included between the second auxiliary support pillar SPS2 and the data line DL, if the common electrode CM above the data line DL is hollowed, the outwardly expanded black matrix BM cannot completely cover the hollow portion CMK, that is, the hollow portion CMK can be partially uncovered, which will cause light leakage of the display panel 2 and lead to display abnormality. Therefore, in order to avoid display abnormality of the display panel 2, the hollow portion CMK is not disposed above the data line DL electrically connected to the fourth pixel sub-unit P04, such that the common electrode CM can be used to shield the electrical signal of the data line DL electrically connected to the fourth pixel sub-unit P04, and ensure that the display panel 2 has a large light transmission area, thereby ensuring high brightness display of the display panel 2.

In some embodiments of the present disclosure, as shown in FIG. 30, the hollow portion CMK of the common electrode CM can overlap the data line DL of any pixel sub-unit P1. For the hollow portion CMK that cannot be covered by the outwardly expanded area of the black matrix BM, for example, the width of the black matrix BM in the second direction Y can be appropriately increased. For example, the width h2 of the black matrix BM in the second direction Y in FIG. 30 is larger than the width h1 of the black matrix BM in the second direction Y in FIG. 28. The increased width of the black matrix BM can cover the hollow portion CMK, thus ensuring the consistency of the charging capacity of each pixel sub-unit P1 of the display panel 2 and display uniformity of the display panel 2.

Figure 31:
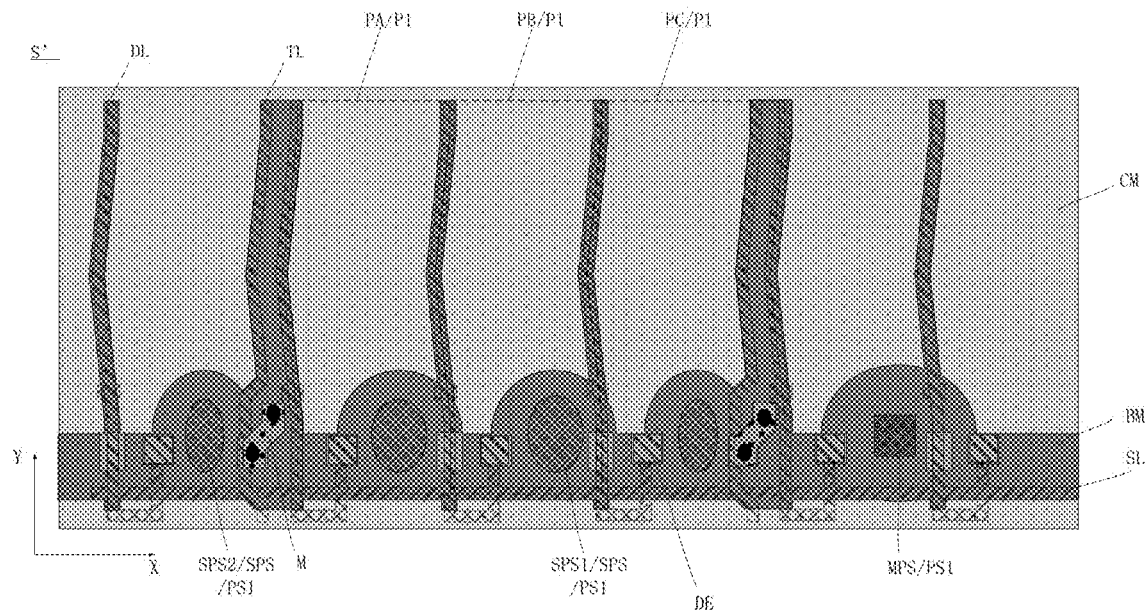
FIG. 31 is a schematic diagram of the area S' of the display panel in FIG. 16 according to another embodiment of the present disclosure.
Figure 32:
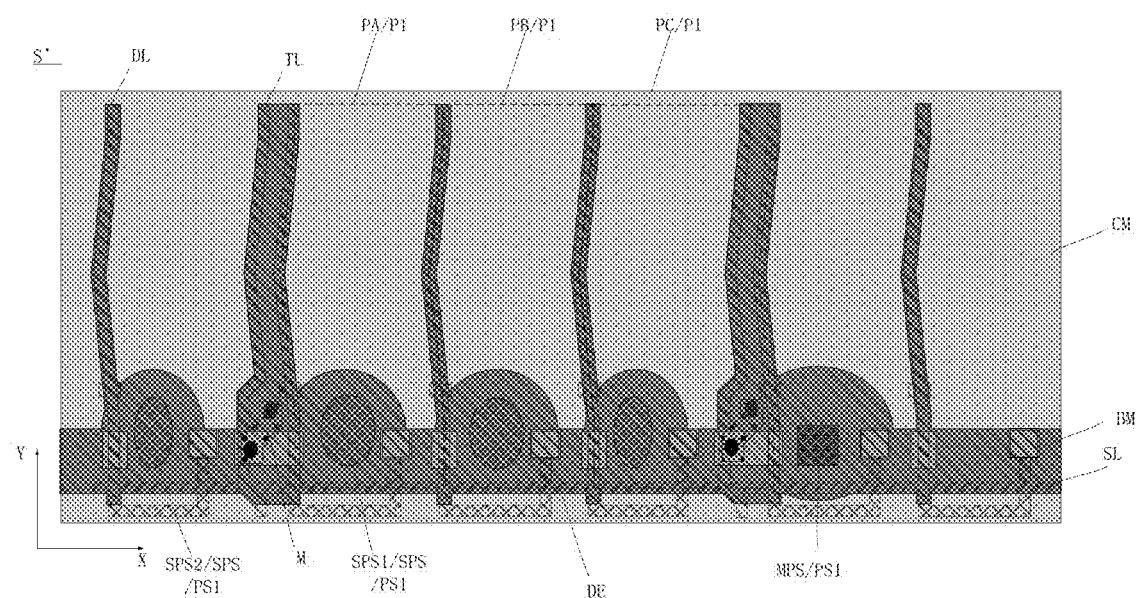
FIG. 32 is a schematic diagram of the area S' of the display panel in FIG. 16 according to another embodiment of the present disclosure.

FIG. 31 is a schematic diagram of the area S' of the display panel in FIG. 16 according to another embodiment of the present disclosure; and FIG. 32 is a schematic diagram of the area S' of the display panel in FIG. 16 according to another embodiment of the present disclosure. In some embodiments of the present disclosure, as shown in FIG. 31 and FIG. 32, based on another arrangement manner of pixel sub-units P1 provided in the present disclosure, the pixel sub-units P1 include the first pixel sub-unit PA, the second pixel sub-unit PB, and the third pixel sub-unit PC that are sequentially disposed adjacent to one another in the first direction X, and the three pixel sub-units are cyclically provided. The data line DL electrically connected to the second pixel sub-unit PB is included between the drain DE of the first pixel sub-unit PA and the drain DE of the second pixel sub-unit PB, the data line DL electrically connected to the third pixel sub-unit PC is included between the drain DE of the second pixel sub-unit PB and the drain DE of the third pixel sub-unit PC, and the touch line TL and the data line DL electrically connected to the first pixel sub-unit PA are included between the drain DE of the third pixel sub-unit PC and the drain DE of the first pixel sub-unit PA. The auxiliary support pillars SPS include a first auxiliary support pillar SPS1 and a second auxiliary support pillar SPS2. Among the first support pillars PS1, in the direction perpendicular to the plane of the display panel 2, the projection of the first auxiliary support pillar SPS1 is located between the projection of the drain DE of the first pixel sub-unit PA and the projection of the data line DL electrically connected to the second pixel sub-unit PB, and/or the projection of the first auxiliary support pillar SPS1 is located between the projection of the drain DE of the second pixel sub-unit PB and the projection of the data line DL electrically connected to the third pixel sub-unit PC, and the projection of the second auxiliary support pillar SPS2 is located between the projection of the drain DE of the third pixel sub-unit PC and the projection of the data line DL electrically connected to the first pixel sub-unit PA, so that the projection of the hollow portion CMK does not overlap the projection of the data line DL electrically connected to the first pixel sub-unit PA, that is, the hollow portion CMK is not disposed above the data line DL electrically connected to the first pixel sub-unit PA.

The data line DL electrically connected to the first pixel sub-unit PA and the touch line TL are included between the drain DE of the third pixel sub-unit PC and the drain DE of the first pixel sub-unit PA, the second auxiliary support pillar SPS2 occupies between the drain DE of the third pixel sub-unit PC and the touch line TL, and the second auxiliary support pillar SPS2 has a small area. In order to prevent liquid crystal disturbance around the support pillar from affecting the display uniformity of the display panel 2 when pressed, therefore, the area covered by black matrix BM is expanded outward from the area at which the support pillar is located. Because the second auxiliary support pillar SPS2 has a relatively small area, the outward expansion range of the black matrix BM is also small. The touch line TL is also included between the second auxiliary support pillar SPS2 and the data line DL, if the common electrode CM above the data line DL is hollowed, the outwardly expanded black matrix BM cannot completely cover the hollow portion CMK, that is, the hollow portion CMK can be partially uncovered, which will cause light leakage of the display panel 2 and lead to display abnormality. Therefore, in order to avoid display abnormality of the display panel 2, the hollow portion CMK is not disposed above the data line DL electrically connected to the first pixel sub-unit PA, such that the common electrode CM can be used to shade the electrical signal of the data line DL electrically connected to the first pixel sub-unit PA, and ensure that the display panel 2 has a large light transmission area, thereby ensuring high brightness display of the display panel 2.

In some embodiments of the present disclosure, as shown in FIG. 32, in the direction perpendicular to the plane of the display panel 2, when the projection of the first auxiliary support pillar SPS1 is located between the projection of the drain DE of the first pixel sub-unit PA and the projection of the data line DL electrically connected to the first pixel sub-unit PA, and/or the projection of the first auxiliary support pillar SPS1 is located between the projection of the drain DE of the second pixel sub-unit PB and the projection of the data line DL electrically connected to the second pixel sub-unit PB, and the projection of the second auxiliary support pillar SPS2 is located between the projection of the drain DE of the third pixel sub-unit PC and the data line DL electrically connected to the third pixel sub-unit PC. In this case, the projection of the hollow portion CMK can overlap the projections of the data lines DL electrically connected to the first pixel sub-unit PA, the second pixel sub-unit PB, and the third pixel sub-unit PC. That is, the hollow portion CMK is provided above each of the data lines DL electrically connected to the first pixel sub-unit PA, the second pixel sub-unit PB, and the third pixel sub-unit PC.

Since the first support pillars PS1 are disposed between the data line DL and the drain DE of the corresponding pixel sub-unit P1 and are disposed adjacent to the data line DL, when the black matrix BM is disposed at the position of the first support pillar PS1 for shading, the area covered by the black matrix BM expands outward from the area at which the first support pillar PS1 is located, to cover part of the data line DL. Therefore, in this area, disposing the hollow portion CMK for the common electrode CM not only reduces the parasitic capacitance between the common electrode CM and the data line DL, thus improving the charging capacity of the thin film transistor, but also avoids the light leakage of the display panel 2 by using the black matrix BM that expands outward from the position at which the first support pillar PS1 is located, and ensures that the display panel 2 has a large light transmission area to ensure high brightness display of the display panel 2.

Figure 33:
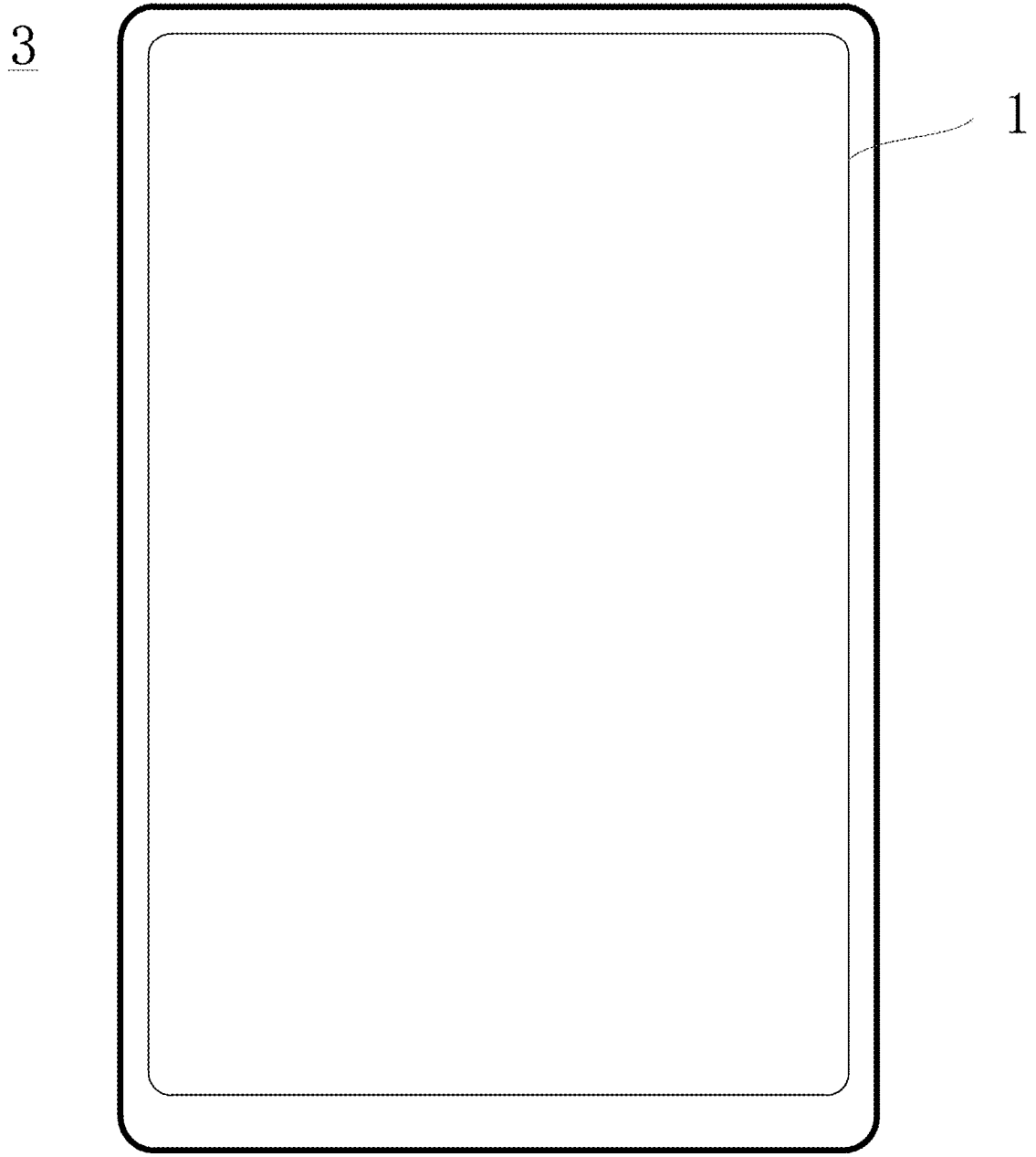
FIG. 33 is a schematic top view of a display apparatus according to an embodiment of the present disclosure.

The present disclosure further provides a display apparatus. The display apparatus can be a smart phone, a tablet display device, a notebook display device or other display terminal products. FIG. 33 is a schematic top view of a display apparatus according to an embodiment of the present disclosure. As shown in FIG. 33, the display apparatus 3 includes the above display panel 1 or display panel 2. The beneficial effects of the display apparatus 3 are the same as described in the above embodiments, and are not elaborated herein.

The above shows and describes several preferred embodiments of the present disclosure. But as mentioned above, it should be understood that the present disclosure is not limited to the form disclosed herein, and the explanation should not be regarded as an exclusion of other embodiments. Various combinations, modifications and environments can be achieved through the above teachings and technologies or knowledge in related art within the scope of the present disclosure described herein. All the modifications and changes made by those skilled in the art without departing from the spirit and scope of the present disclosure shall also fall within the protection scope of appended claims of the present disclosure.

What is claimed is:
1. A display panel, comprising:
an array substrate;
a color film substrate disposed opposite to the array substrate;
support pillars disposed between the array substrate and the color film substrate, wherein the support pillars comprise a primary support pillar disposed at a side of one of the array substrate or the color film substrate and abutting against a surface of the other of the array substrate or the color film substrate, wherein the primary support pillar comprises a first support pillar;
pixel sub-units arranged in an array;
scan lines extending in a first direction; and
data lines extending in a second direction,
wherein the first direction and the second direction intersect each other, the pixel sub-units are formed by crossing the scan lines and the data lines, the pixel sub-units each comprise a thin film transistor and a pixel electrode, the thin film transistor comprises a gate, a source and a drain, the scan line is electrically connected to the gate, the data line is electrically connected to the source, and the pixel electrode is electrically connected to the drain;

wherein in the first direction, a projection of the first support pillar in a direction perpendicular to a plane of the display panel is located between projections of two adjacent data lines in the direction perpendicular to the plane of the display panel, and in the second direction, the projection of the first support pillar in the direction perpendicular to the plane of the display panel is located at a side of a projection of the scan line in the direction perpendicular to the plane of the display panel;

wherein the support pillars further comprise auxiliary support pillars, the primary support pillar has a height greater than the auxiliary support pillars in the direction perpendicular to the plane of the display panel, and the auxiliary support pillars comprise the first support pillar; and wherein in the direction perpendicular to the plane of the display panel, among the first support pillars disposed, a projection of the primary support pillar does not overlap with a projection of the pixel electrode, and a projection of the auxiliary support pillar overlaps with the projection of the pixel electrode.

2. The display panel according to claim 1, wherein the pixel sub-units comprise a first pixel sub-unit and a second pixel sub-unit, the second pixel sub-unit is adjacent to the first pixel sub-unit in the first direction, in the direction perpendicular to the plane of the display panel, a projection of the data line electrically connected to the second pixel sub-unit is located between a projection of the drain of the first pixel sub-unit and a projection of the drain of the second pixel sub-unit; and a projection of the first support pillar overlaps a projection of the first pixel sub-unit, and the projection of the first support pillar is located between the projection of the drain of the first pixel sub-unit and a projection of the data line electrically connected to the first pixel sub-unit.

3. The display panel according to claim 2, wherein, in the direction perpendicular to the plane of the display panel, a distance in the first direction between the projection of the drain of the first pixel sub-unit and the projection of the data line electrically connected to the first pixel sub-unit is defined as L3, a distance in the first direction between the projection of the drain of the first pixel sub-unit and the projection of the data line electrically connected to the second pixel sub-unit is defined as L4, and L3>L4.

4. The display panel according to claim 3, wherein L4≥2.8 µm.

5. The display panel according to claim 3, wherein the pixel sub-units comprise a third pixel sub-unit, and the projection of the first support pillar does not overlap a projection of the third pixel sub-unit in the direction perpendicular to the plane of the display panel; and a distance in the first direction between a projection of a drain of the third pixel sub-unit and a projection of the data line electrically connected to the third pixel sub-unit is defined as D2, and D2<L3.

6. The display panel according to claim 2, in the direction perpendicular to the plane of the display panel, a distance in the first direction between a projection of the drain of any of the pixel sub-units and a projection of the data line electrically connected to the pixel sub-unit is defined as W3, and a distance in the first direction between the projection of the drain of the pixel sub-unit and a projection of the data line electrically connected to an adjacent pixel sub-unit is defined as W4; and

W3>W4.

7. The display panel according to claim 1, wherein the pixel sub-units comprise a first pixel sub-unit, and the first pixel sub-unit comprises a type-A first pixel sub-unit and a type-B first pixel sub-unit, in the direction perpendicular to the plane of the display panel, the projection of the auxiliary support pillar in the first support pillars overlaps a projection of the type-A first pixel sub-unit and a projection of the type-B first pixel sub-unit; and an overlapping area between the projection of the auxiliary support pillar and a projection of the pixel electrode of the type-A first pixel sub-unit is defined as S1, an overlapping area between the projection of the auxiliary support pillar and a projection of the pixel electrode of the first pixel sub-unit B is defined as S2, and S1≠S2.

8. The display panel according to claim 7, wherein in the direction perpendicular to the plane of the display panel, when the projection of the primary support pillar in the first support pillars overlaps the projection of the type-A first pixel sub-unit, S1<S2.

9. The display panel according to claim 1, wherein the display panel comprises a touch line and a touch electrode, and the touch line is located in a same metal layer as the data line;

in the first direction, the pixel sub-units comprise a first pixel sub-unit and a second pixel sub-unit disposed adjacent to each other, and a third pixel sub-unit and a fourth pixel sub-unit disposed adjacent to each other;

in the first direction, the data line electrically connected to the second pixel sub-unit is disposed between the drain of the first pixel sub-unit and the drain of the second pixel sub-unit, and the touch line and the data line electrically connected to the fourth pixel sub-unit are disposed between the drain of the third pixel sub-unit and the drain of the fourth pixel sub-unit; and in the direction perpendicular to the plane of the display panel, the projection of the first support pillar overlaps the projection of the first pixel sub-unit.

10. The display panel according to claim 9, wherein the support pillars further comprise auxiliary support pillars, the primary support pillar has a height greater than the auxiliary support pillars in the direction perpendicular to the plane of the display panel, the auxiliary support pillars comprise a first auxiliary support pillar and a second auxiliary support pillar, and the first auxiliary support pillar has a projection area larger than the second auxiliary support pillar; and the first auxiliary support pillar and the second auxiliary support pillar each comprise the first support pillar, a projection of the first auxiliary support pillar overlaps the projection of the first pixel sub-unit, and a projection of the second auxiliary support pillar overlaps the projection of the third pixel sub-unit.

11. The display panel according to claim 10, wherein in the direction perpendicular to the plane of the display panel, the projection of the second auxiliary support pillar is located between the projection of the drain of the third pixel sub-unit and the projection of the data line electrically connected to the third pixel sub-unit; and a distance in the first direction between the projection of the drain of the third pixel sub-unit and the projection of the data line electrically connected to the third pixel sub-unit is defined as Q1, a distance in the first direction between the projection of the drain of the first pixel sub-unit and the projection of the data line electrically connected to the first pixel sub-unit is defined as Q2, and Q1<Q2.

12. The display panel according to claim 10, wherein in the direction perpendicular to the plane of the display panel, among the first support pillars disposed, the projection of the primary support pillar does not overlap the projection of the pixel electrode, an overlapping area between the projection of the first auxiliary support pillar and the projection of the pixel electrode is defined as S3, an overlapping area between the projection of the second auxiliary support pillar and the projection of the pixel electrode is defined as S4, and S3≠S4.

13. The display panel according to claim 12, wherein in the direction perpendicular to the plane of the display panel, overlapping areas between the projection of the first auxiliary support pillar and projections of the pixel electrodes comprise S31 and S32, and S31≠S32.

14. The display panel according to claim 9, further comprising a common electrode and a bridging layer, wherein the common electrode is reused as the touch electrode, and the bridging layer is electrically connected to the common electrode and the touch line; and in the direction perpendicular to the plane of the display panel, a projection of the bridging layer is located between the projection of the drain of the third pixel sub-unit and the projection of the data line electrically connected to the fourth pixel sub-unit.

15. The display panel according to claim 1, further comprising a touch line and a touch electrode, wherein the touch line is located in a same metal layer as the data line;

in the first direction, the pixel sub-units comprise a first pixel sub-unit, a second pixel sub-unit, and a third pixel sub-unit sequentially disposed adjacent to one another;

the data line electrically connected to the second pixel sub-unit is disposed between the drain of the first pixel sub-unit and the drain of the second pixel sub-unit, the data line electrically connected to the third pixel sub-unit is disposed between the drain of the second pixel sub-unit and the drain of the third pixel sub-unit, and the touch line and the data line electrically connected to the first pixel sub-unit are disposed between the drain of the third pixel sub-unit and the drain of the first pixel sub-unit; and in the direction perpendicular to the plane of the display panel, the projection of the first support pillar overlaps the projection of the first pixel sub-unit or the projection of the second pixel sub-unit.

16. The display panel according to claim 15, wherein the support pillars further comprise auxiliary support pillars, the primary support pillar has a height greater than the auxiliary support pillars in the direction perpendicular to the plane of the display panel, the auxiliary support pillars comprise a first auxiliary support pillar and a second auxiliary support pillar, and the first auxiliary support pillar has a projection area larger than the second auxiliary support pillar; and the first auxiliary support pillar and the second auxiliary support pillar each comprise the first support pillar, the projection of the first auxiliary support pillar overlaps the projection of the first pixel sub-unit or the projection of the second pixel sub-unit, and the projection of the second auxiliary support pillar overlaps the projection of the third pixel sub-unit.

17. The display panel according to claim 1, further comprising at least one metal layer, wherein in the direction perpendicular to the plane of the display panel, the projection of the first support pillar does not overlap a projection of any of the at least one metal layer on the display panel.

18. The display panel according to claim 1, further comprising a common electrode, wherein the common electrode comprises a hollow portion;

in the direction perpendicular to the plane of the display panel, a projection of the hollow portion overlaps the projection of the drain of any of the pixel sub-units, and the projection of the hollow portion overlaps the projection of the data line electrically connected to at least some pixel sub-units; and the color film substrate comprises a black matrix, wherein the projection of the hollow portion is located within the projection of the black matrix.

19. The display panel according to claim 18, wherein the support pillars further comprise auxiliary support pillars, the primary support pillar has a height greater than the auxiliary support pillars in the direction perpendicular to the plane of the display panel, the auxiliary support pillars comprise a first auxiliary support pillar and a second auxiliary support pillar, and the first auxiliary support pillar has a projection area larger than the second auxiliary support pillar;

the first auxiliary support pillar and the second auxiliary support pillar comprise the first support pillar, the projection of the first auxiliary support pillar is located between the projection of the drain of the first pixel sub-unit and the projection of the data line electrically connected to the second pixel sub-unit, and the projection of the second auxiliary support pillar is located between a projection of the drain of the third pixel sub-unit and a projection of the data line electrically connected to the fourth pixel sub-unit; and the projection of the hollow portion does not overlap the projection of the data line electrically connected to the fourth pixel sub-unit.

20. The display panel according to claim 18, wherein the support pillars further comprise auxiliary support pillars, the primary support pillar has a height greater than the auxiliary support pillars in the direction perpendicular to the plane of the display panel, the auxiliary support pillars comprise a first auxiliary support pillar and a second auxiliary support pillar, and the first auxiliary support pillar has a projection area larger than the second auxiliary support pillar;

the first auxiliary support pillar and the second auxiliary support pillar each comprise the first support pillar, the projection of the first auxiliary support pillar is located between the projection of the drain of the first pixel sub-unit and the projection of the data line electrically connected to the second pixel sub-unit, or the projection of the first auxiliary support pillar is located between the projection of the drain of the second pixel sub-unit and the projection of the data line electrically connected to the third pixel sub-unit, and the projection of the second auxiliary support pillar is located between the projection of the drain of the third pixel sub-unit and the projection of the data line electrically connected to the first pixel sub-unit; and the projection of the hollow portion does not overlap the projection of the data line electrically connected to the first pixel sub-unit.

21. The display panel according to claim 1, wherein the pixel sub-units comprise a first pixel sub-unit and a second pixel sub-unit, the second pixel sub-unit is adjacent to the first pixel sub-unit in the first direction, in the direction perpendicular to the plane of the display panel, a projection of the data line electrically connected to the second pixel sub-unit is located between a projection of the drain of the first pixel sub-unit and a projection of the drain of the second pixel sub-unit; and a projection of the first support pillar overlaps a projection of the first pixel sub-unit, and the projection of the first support pillar is located between the projection of the drain of the first pixel sub-unit and the projection of the data line electrically connected to the second pixel sub-unit.

22. The display panel according to claim 21, wherein in the direction perpendicular to the plane of the display panel, a distance in the first direction between the projection of the drain of the first pixel sub-unit and the projection of the data line electrically connected to the first pixel sub-unit is defined as L1, a distance in the first direction between the projection of the drain of the first pixel sub-unit and the projection of the data line electrically connected to the second pixel sub-unit is defined as L2, and L1<L2.

23. The display panel according to claim 22, wherein $L1 \geq 2.8$ μm.

24. The display panel according to claim 22, wherein the pixel sub-units comprise a third pixel sub-unit, and the projection of the first support pillar does not overlap a projection of the third pixel sub-unit in the direction perpendicular to the plane of the display panel; and a distance in the first direction between a projection of a drain of the third pixel sub-unit and a projection of the data line electrically connected to the third pixel sub-unit is defined as D1, and D1>L1.

25. The display panel according to claim 21, wherein, in the direction perpendicular to the plane of the display panel, a distance in the first direction between a projection of the drain of any of the pixel sub-units and a projection of the data line electrically connected to the pixel sub-unit is defined as W1, and a distance in the first direction between the projection of the drain of the pixel sub-unit and a projection of the data line electrically connected to an adjacent pixel sub-unit is defined as W2; and

W1<W2.

26. A display apparatus, comprising a display panel, wherein the display panel comprises:

an array substrate;

a color film substrate disposed opposite to the array substrate;

support pillars disposed between the array substrate and the color film substrate, wherein the support pillars comprise a primary support pillar disposed at a side of one of the array substrate or the color film substrate and abutting against a surface of the other of the array substrate or the color film substrate, and the primary support pillar comprises a first support pillar;

pixel sub-units arranged in an array;

scan lines extending in a first direction; and data lines extending in a second direction, wherein the first direction and the second direction intersect each other, the pixel sub-units are formed by crossing the scan lines and the data lines, the pixel sub-units each comprise a thin film transistor and a pixel electrode, the thin film transistor comprises a gate, a source and a drain, the scan line is electrically connected to the gate, the data line is electrically connected to the source, and the pixel electrode is electrically connected to the drain;

wherein in the first direction, a projection of the first support pillar in a direction perpendicular to a plane of the display panel is located between projections of two adjacent data lines in the direction perpendicular to the plane of the display panel; and in the second direction, the projection of the first support pillar in the direction perpendicular to the plane of the display panel is located at a side of a projection of the scan line in the direction perpendicular to the plane of the display panel;

wherein the support pillars further comprise auxiliary support pillars, the primary support pillar has a height greater than the auxiliary support pillars in the direction perpendicular to the plane of the display panel, and the auxiliary support pillars comprise the first support pillar; and wherein in the direction perpendicular to the plane of the display panel, among the first support pillars disposed, a projection of the primary support pillar does not overlap with a projection of the pixel electrode, and a projection of the auxiliary support pillar overlaps with the projection of the pixel electrode.

* * * * *